United States Patent
Ichihashi

(10) Patent No.: US 10,885,389 B2
(45) Date of Patent: Jan. 5, 2021

(54) IMAGE PROCESSING DEVICE, IMAGE PROCESSING METHOD, LEARNING DEVICE, AND LEARNING METHOD

(71) Applicant: SONY CORPORATION, Tokyo (JP)

(72) Inventor: Hideyuki Ichihashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 16/094,666

(22) PCT Filed: Feb. 27, 2017

(86) PCT No.: PCT/JP2017/007367
§ 371 (c)(1),
(2) Date: Oct. 18, 2018

(87) PCT Pub. No.: WO2017/208536
PCT Pub. Date: Dec. 7, 2017

(65) Prior Publication Data
US 2019/0122080 A1  Apr. 25, 2019

(30) Foreign Application Priority Data
Jun. 2, 2016 (JP) .................... 2016-110808

(51) Int. Cl.
*H04N 5/225* (2006.01)
*G06K 9/62* (2006.01)
(Continued)

(52) U.S. Cl.
CPC .......... *G06K 9/6262* (2013.01); *G06N 3/08* (2013.01); *G06T 1/00* (2013.01); *H04N 5/225* (2013.01);
(Continued)

(58) Field of Classification Search
CPC .................. H04N 5/225; H04N 5/232
See application file for complete search history.

(56) References Cited

U.S. PATENT DOCUMENTS

2014/0294294 A1* 10/2014 Tsuchiya ............. G06T 5/003
382/159

FOREIGN PATENT DOCUMENTS

CN  104079801 A  10/2014
JP  2002-330332 A  11/2002
(Continued)

OTHER PUBLICATIONS

May 12, 2020, Japanese Office Action issued for related JP application No. 2018-520370.

*Primary Examiner* — Myron Wyche
(74) *Attorney, Agent, or Firm* — Paratus Law Group, PLLC

(57) ABSTRACT

A first imaging simulation section in a learning device generates image data that indicates a learning image captured by the imaging section from image data on the learning image, and a second imaging simulation section generates image data that indicates the learning image captured by an imaging section from the image data on the learning image. A plurality of parameter generation sections each generate a characteristic difference correction parameter for making characteristics of student data identical to characteristics of teacher data by learning, assuming one of the generated image data as the teacher data and the other image data as the student data, and the parameter generation sections store the generated characteristic difference correction parameters in a plurality of database sections. A characteristic difference correction section corrects one image data having a lower performance to image data having a high performance, using the stored characteristic difference parameters.

14 Claims, 19 Drawing Sheets

(51) Int. Cl.
*H04N 5/232* (2006.01)
*G06T 1/00* (2006.01)
*G06N 3/08* (2006.01)
*H04N 9/04* (2006.01)

(52) U.S. Cl.
CPC ... *H04N 5/232* (2013.01); *G06T 2207/20081* (2013.01); *H04N 9/045* (2013.01)

(56) References Cited

FOREIGN PATENT DOCUMENTS

| | | | | |
|---|---|---|---|---|
| JP | 2002330332 | * 11/2002 | ............. | H04N 5/225 |
| JP | 2013-192152 A | 9/2013 | | |
| JP | 2013192152 | * 9/2013 | ............. | H04N 5/225 |
| JP | 2013-219525 A | 10/2013 | | |
| JP | 2013236172 | * 11/2013 | ............. | H04N 5/232 |
| JP | 2014-194706 A | 10/2014 | | |
| JP | 2015-088824 A | 5/2015 | | |

* cited by examiner

FIG.1
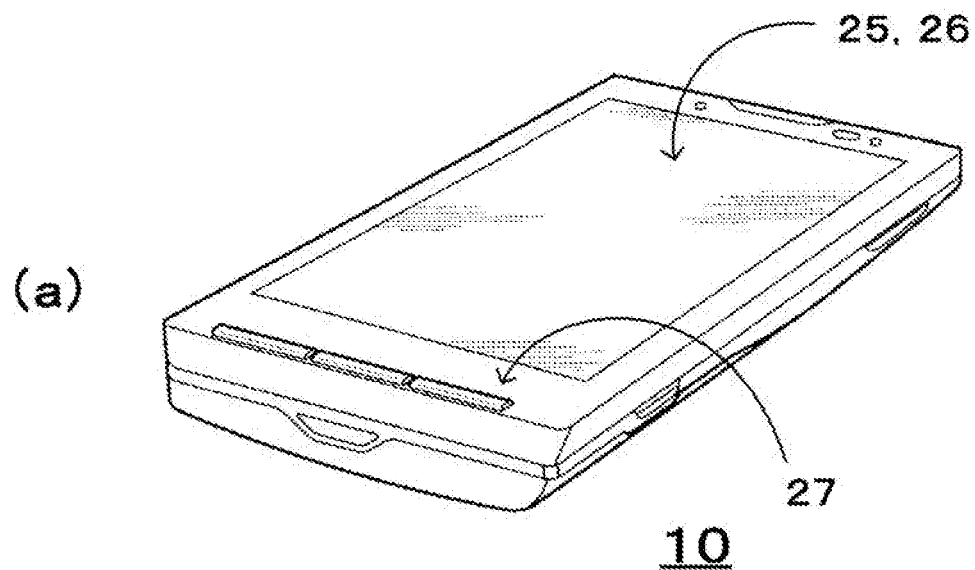
(a)
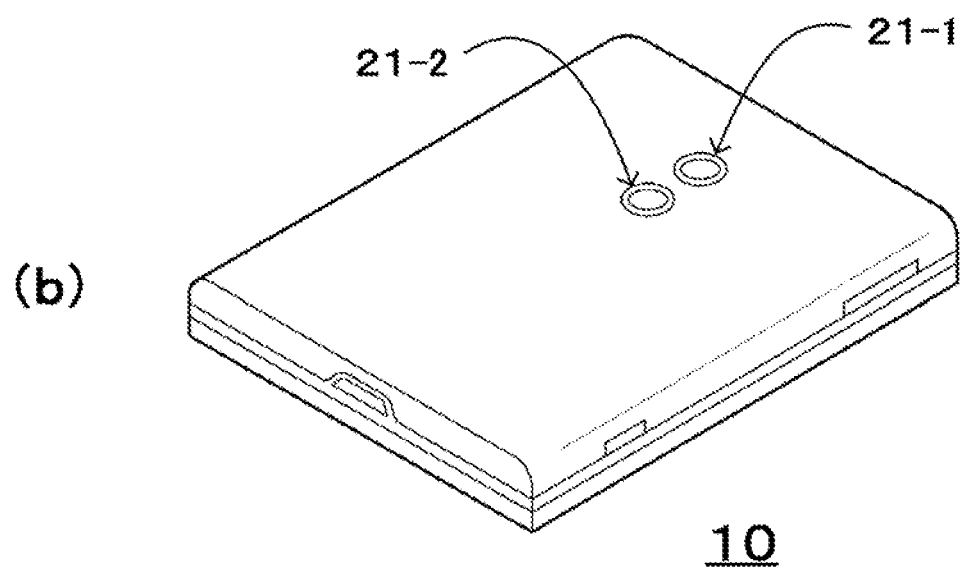
(b)

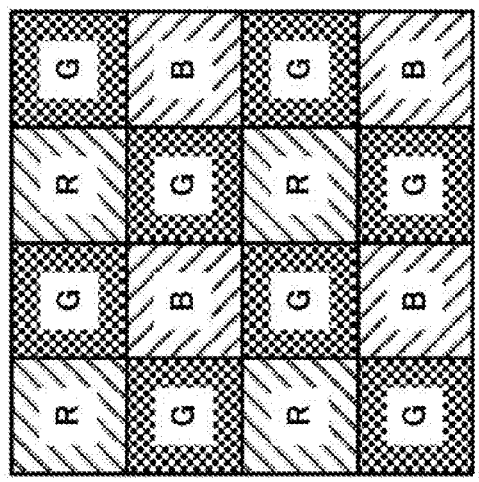
(b)
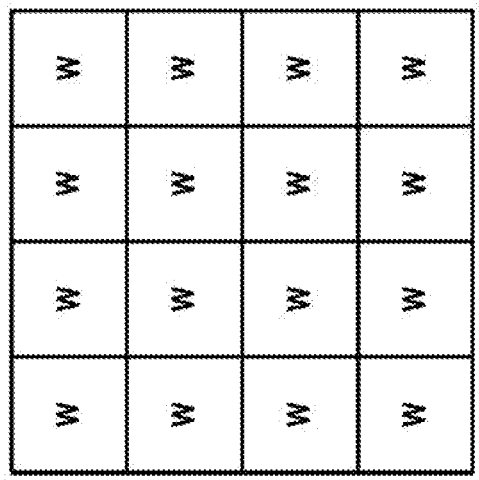
(a)
FIG. 4

FIG.11
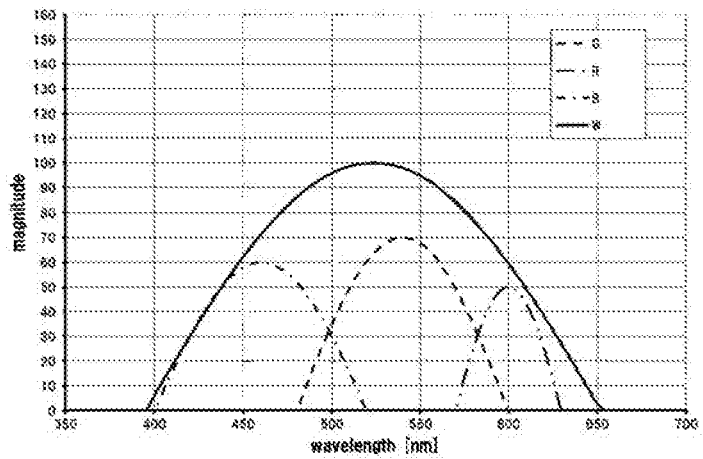
(a)
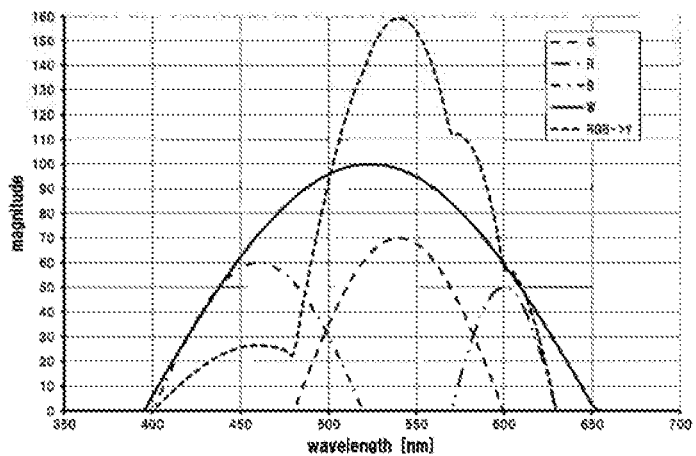
(b)
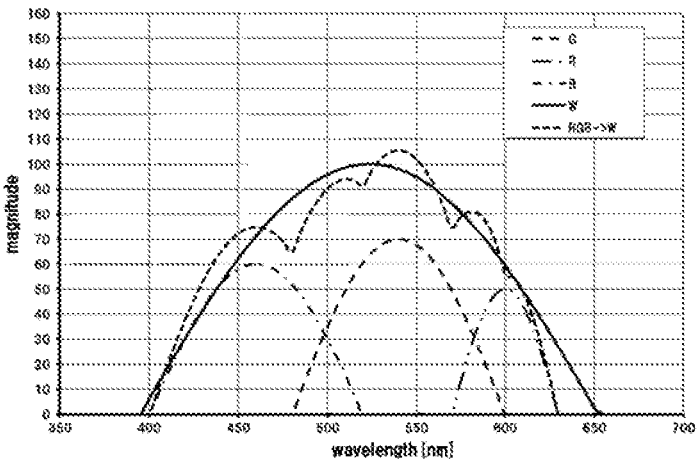
(c)

FIG. 14

| COLOR SPACE | | BLACK-AND-WHITE IMAGE DATA | COLOR IMAGE DATA | COMBINED IMAGE DATA |
|---|---|---|---|---|
| COLOR SPACE | | W | RGB | RGB |
| BAND | RESOLUTION | ○ | △ | ○ |
| BAND | SENSITIVITY | ◎ | ○ | ◎ |

FIG. 16

| ANGLE OF VIEW | COLOR ARRAY | ANGLE OF VIEW | FOCUS | OTHERS |
|---|---|---|---|---|
| • WIDE ANGLE<br>• TELEPHOTO | • BAYER ARRAY<br>• SINGLE WHITE PIXELS<br>• SIX COLOR PIXEL ARRAY<br>• VERTICAL SPECTROSCOPY | • LONG/SHORT EXPOSURE<br>• EXPOSURE TIMING | • FOREGROUND FOCUS<br>  / BACKGROUND FOCUS | • NUMBER OF PIXELS<br>• PIXEL ARRAY<br>• LIGHT SOURCE<br>• POLARIZATION |

IMAGE PROCESSING DEVICE, IMAGE PROCESSING METHOD, LEARNING DEVICE, AND LEARNING METHOD

CROSS REFERENCE TO PRIOR APPLICATION

This application is a National Stage Patent Application of PCT International Patent Application No. PCT/JP2017/007367 (filed on Feb. 27, 2017) under 35 U.S.C. § 371, which claims priority to Japanese Patent Application No. 2016-110808 (filed on Jun. 2, 2016), which are all hereby incorporated by reference in their entirety.

TECHNICAL FIELD

The present technology relates to an image processing device, an image processing method, a learning device, and a learning method capable of generating image data on a captured image having an improved performance, compared with captured images generated individually by a plurality of imaging sections, using the image data on the captured images generated individually.

BACKGROUND ART

In a conventional information processing terminal such as a mobile electronic device, for example, a smart phone, a performance of an imaging section is lower than that of a single-lens reflex camera or the like due to miniaturization and slimming down. To address the problem, Patent Literature 1, for example, proposes that a captured image generated by a camera removable from an information processing terminal be supplied to the information processing terminal by wireless communication. In addition, Patent Literature 2 discloses providing a plurality of imaging sections to simultaneously generate a plurality of images having different image qualities, for example, an image at a first angle of view and an image of a second angle of view smaller than the first angle of view.

CITATION LIST

Patent Literature

[PTL 1]
JP 2015-088824 A
JP 2013-219525 A

SUMMARY

Technical Problems

Meanwhile, a removable camera is larger in size than an imaging section of an information processing terminal, and it is necessary to establish communication between the removable camera and the information processing terminal in a case of utilizing the removable camera. This makes operation for obtaining a favorable captured image complicated and reduces portability. In addition, even with the plurality of imaging sections provided, the acquired images are those according to performances of the respective imaging sections, and it is impossible to improve the image quality of the image at, for example, the first angle of view.

An object of the present technology is, therefore, to provide an image processing device, an image processing method, a learning device, and a learning method capable of generating image data on a captured image having an improved performance, compared with captured images generated individually by a plurality of imaging sections, using the image data on the captured images generated individually.

Solution to Problems

According to a first aspect of the present technology, there is provided an image processing device including a characteristic difference correction section correcting, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section to image data having a higher performance.

According to the present technology, the characteristic difference correction section corrects the one image data having the lower performance out of the image data on the captured images generated by the first imaging section and the second imaging section to the image data having the higher performance in accordance with the learning model for making the characteristics of the student data identical to characteristics of teacher data, assuming one of the image data on the learning image generated by the first imaging section and the image data on the learning image generated by the second imaging section and different in characteristics from the first imaging section as the teacher data and the other image data as the student data, for example, using a characteristic difference correction parameter generated in advance by learning for making the characteristics of the student data identical to the characteristics of the teacher data. The performance includes an image quality performance, and the characteristic difference correction section performs, as the correction of the characteristic difference related to the image quality performance, correction of a characteristic difference that is at least one of a color space difference and a band difference. For example, the first imaging section generates image data on a captured black-and-white image, the second imaging section generates image data on a captured color image that indicates one color component, and the characteristic difference correction section makes a sensitivity of the image data on the captured color image higher than a sensitivity of the image data generated by the second imaging section, as the correction of the characteristic difference with respect to the band difference. In addition, the performance includes a functional performance, and the characteristic difference correction section performs, as the correction of the characteristic difference related to the functional performance, correction of a characteristic difference caused by a difference in at least any of an angle of view, a focal length, focusing control, diaphragm control, and white balance control.

Furthermore, the image processing device further includes: a parallax detecting section detecting a parallax between the first imaging section and the second imaging section using the image data generated in the first imaging section and the second imaging section and corrected characteristic difference by the characteristic difference correction section; and a parallax compensation section performing parallax compensation for the image data generated by the first imaging section and the second imaging section on the basis of a parallax detection result detected by the parallax detecting section. For example, the parallax compensation section performs the parallax compensation on one of the image data generated by the first imaging section and the second imaging section, and the characteristic difference correction section corrects a resolution of the other image data to a resolution of the image data subjected to the parallax compensation for the image data used in detection of the parallax.

Moreover, combining of the image data after the parallax compensation for the image data generated by the first imaging section and the second imaging section is performed using a combining control parameter generated in advance by learning for making characteristics of combined data of a plurality of pieces of student data identical to characteristics of teacher data, assuming image data on a learning image as the teacher data and the image data on the learning image generated by the first imaging section and the image data on the learning image generated by the second imaging section as the student data.

According to a second aspect of the present technology, there is provided an image processing method, including correcting, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section to image data having a higher performance.

According to a third aspect of the present technology, there is provided a learning device including a characteristic difference parameter generation section generating a characteristic difference correction parameter for making characteristics of student data identical to characteristics of teacher data by learning, assuming, for image data that indicates a learning image generated by a first imaging simulation section from image data on the learning image captured by a first imaging section and image data that indicates the learning image generated by a second imaging simulation section from the image data on the learning image captured by a second imaging section, one of the image data as the teacher data and the other image data as the student data.

According to a fourth aspect of the present technology, there is provided a learning method including generating, by a characteristic difference parameter generation section, a characteristic difference correction parameter for making characteristics of student data identical to characteristics of teacher data by learning, assuming, for image data that indicates a learning image generated by a first imaging simulation section from image data on the learning image captured by a first imaging section and image data that indicates the learning image generated by a second imaging simulation section from the image data on the learning image captured by a second imaging section, one of the image data as the teacher data and the other image data as the student data.

Advantageous Effect of Invention

According to the present invention, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section is corrected to image data having a higher performance. Thus, it is possible to generate image data on a captured image having an improved performance, compared with captured images generated individually by a plurality of imaging sections, using the image data on the captured images generated individually. It is noted that the effects described in the present specification are given as an example only, and the effects are not limited to those described in the present specification and may contain additional effects.

BRIEF DESCRIPTION OF DRAWINGS

FIG. 1 is a diagram depicting an example of an outward appearance of equipment to which an image processing device is applied.

FIG. 4 is a diagram depicting an example of pixel arrays is imaging sections.

FIG. 11 is a diagram schematically depicting a result of characteristic difference correction to a color space.

FIG. 14 is a diagram depicting an image combining operation performed by the image combining section.

FIG. 16 is a diagram depicting an example of combination elements of a configuration and an operation of (captured images generated by) the imaging section.

DESCRIPTION OF EMBODIMENTS

Figure 2:
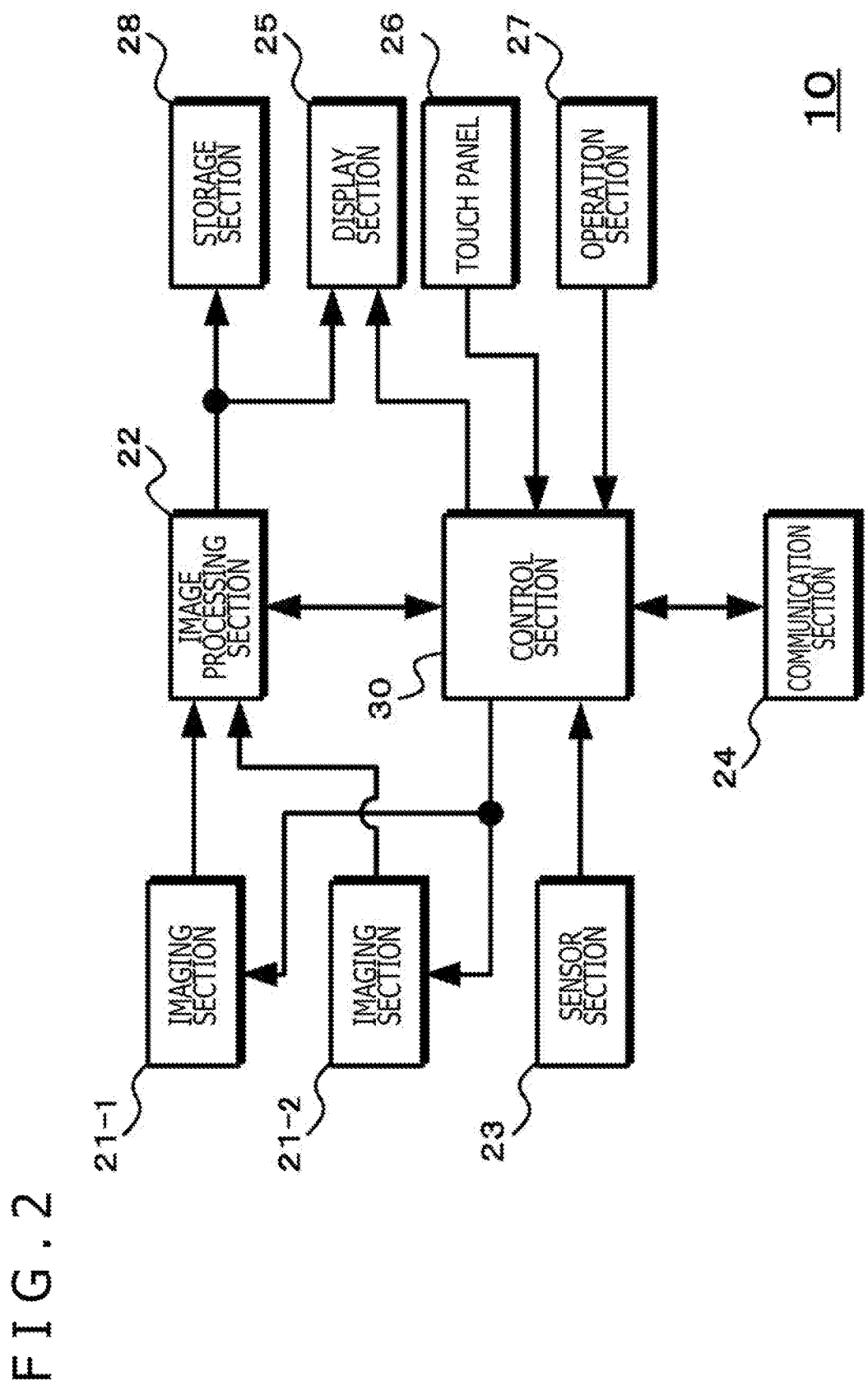
FIG. 2 is a diagram depicting an example of a configuration of an information processing terminal.

Modes for carrying out the present technology will be described hereinafter. It is noted that description will be given in the following order.
1. Configuration of equipment to which image processing device is applied
2. Configuration of image processing device
3. Configuration of learning device
   3-1. Case of generating characteristic difference correction parameters
   3-2. Case of generating combining control parameter
4. Operations performed by learning device and image processing section
5. Modifications
6. Application examples

1. Configuration of Equipment to Which Image Processing Device Is Applied

FIG. 1 depicts an example of an outward appearance of equipment to which an image processing device of the present technology is applied. It is noted that the image processing device is applied to, for example, an information processing terminal in the following description. FIG. 1(a) depicts a front side of an information processing terminal 10, and a display section 25 and an operation section 27 are provided on the front side. FIG. 1(b) depicts a back side of the information processing terminal 10, and a plurality of imaging sections, for example, two imaging sections 21-1 and 21-2 are provided on the back side.

FIG. 2 depicts an example of a configuration of the information processing terminal. The information processing terminal 10 has the plurality of imaging sections, for example, the imaging sections 21-1 and 21-2, an image processing section 22, a sensor section 23, a communication section 24, the display section 25, a touch panel 26, the operation section 27, a storage section 28, and a control section 30.

As depicted in FIG. 1(b), the imaging sections 21-1 and 21-2 are provided on the same surface side of the information processing terminal 10. The imaging sections 21-1 and 21-2 are each configured using an imaging element such as a complementary metal oxide semiconductor (CMOS) image sensor, perform photoelectric conversion on light captured by a lens (not depicted), generate image data on a captured image, and output the image data to the image processing section 22. The image processing section 22 performs image processing using the image data on the captured images generated by the imaging sections 21-1 and 21-2, and generates image data on a captured image having an improved performance, that is, image data on a captured image similar to a captured image generated by an imaging section having a higher performance than performances of the individual imaging sections 21-1 and 21-2.

The performance in the present technology includes an image quality performance and a functional performance. The image quality performance is a performance related to a color space, a resolution, a sensitivity, a noise, and the like of a captured image, while the functional performance is a performance related to functions such as an angle of view, a focal length, focusing control, diaphragm control, white balance control, and the like at a time of generating the captured image.

The imaging sections 21-1 and 21-2 have a characteristic difference related to the image quality therebetween. The characteristic difference related to the image quality is a difference in characteristics related to the image quality performance, and includes at least one of a difference in color space and a difference in band. Examples of the characteristic difference related to the image quality include a spectroscopic characteristic difference (in that one of the imaging sections generates a black-and-white image and the other imaging section generates a color image), a color array difference (in that color filters of one of the imaging sections are in a Bayer array and those of the other imaging section are in a plane array), a difference in the number of pixels (in that one of the imaging sections is higher than the other imaging section in the number of pixels), and a difference in an F-number, a modulation transfer function (MTF) value, or the like. In addition, the imaging sections 21-1 and 21-2 may have a characteristic difference related to the functional performance therebetween as the characteristic difference. Examples of the characteristic difference related to functions include a characteristic difference caused by a difference in at least any of the angle of view, the focal length, the focusing control, the diaphragm control, and the white balance control.

The image processing section 22 performs the image processing using the image data generated by the imaging sections 21-1 and 21-2, generates the image data on the captured image similarly to a case of using the imaging section having the higher performance than those in a case of individually using the imaging sections 21-1 and 21-2, and outputs the image data to the display section 25 and the storage section 28. It is noted that details of a configuration and an operation of the image processing section 22 will be described later.

The sensor section 23 is configured using a gyro sensor or the like, and detects a jitter generated in the information processing terminal 10. The sensor section 23 outputs information about the detected jitter to the control section 30.

The communication section 24 communicates with equipment on a network such as a local area network (LAN) or the Internet.

The display section 25 displays the captured image on the basis of the image data supplied from the image processing section 22, and displays a menu screen, a screen for various kinds of applications, and the like on the basis of an information signal from the control section 30. In addition, the touch panel 26 is mounted on a display surface side of the display section 25, and the touch panel 26 is configured to be able to utilize a GUI function.

The operation section 27 is configured using an operation switch and the like, generates an operation signal in response to a user's operation, and outputs the operation signal to the control section 30.

The storage section 28 stores information generated by the information processing terminal 10, for example, the image data supplied from the image processing section 22 and various kinds of information used to execute communication or applications by the information processing terminal 10.

The control section 30 is configured with a central processing unit (CPU), a read only memory (ROM), a random access memory (RAM) (not depicted), and the like. The control section 30 executes a program stored in the ROM or the RAM to control operations performed by the sections such that the information processing terminal 10 can perform an operation in response to a user's operation on the touch panel 26 or the operation section 27. In addition, database sections DB1 and DB2 that store parameters necessary when the image processing section 22 performs image processing are provided in the control section 30. It is noted that the database sections DB1 and DB2 may be provided in the storage section 28.

It is noted that the configuration of the information processing terminal 10 is not limited to that depicted in FIG. 2 and, for example, a coding processing section that codes image data to store the image data in the storage section 28, a resolution conversion section that causes the image data to comply with a resolution of the display section, and the like may be also provided in the information processing terminal 10.

2. Configuration of Image Processing Device

Figure 3:
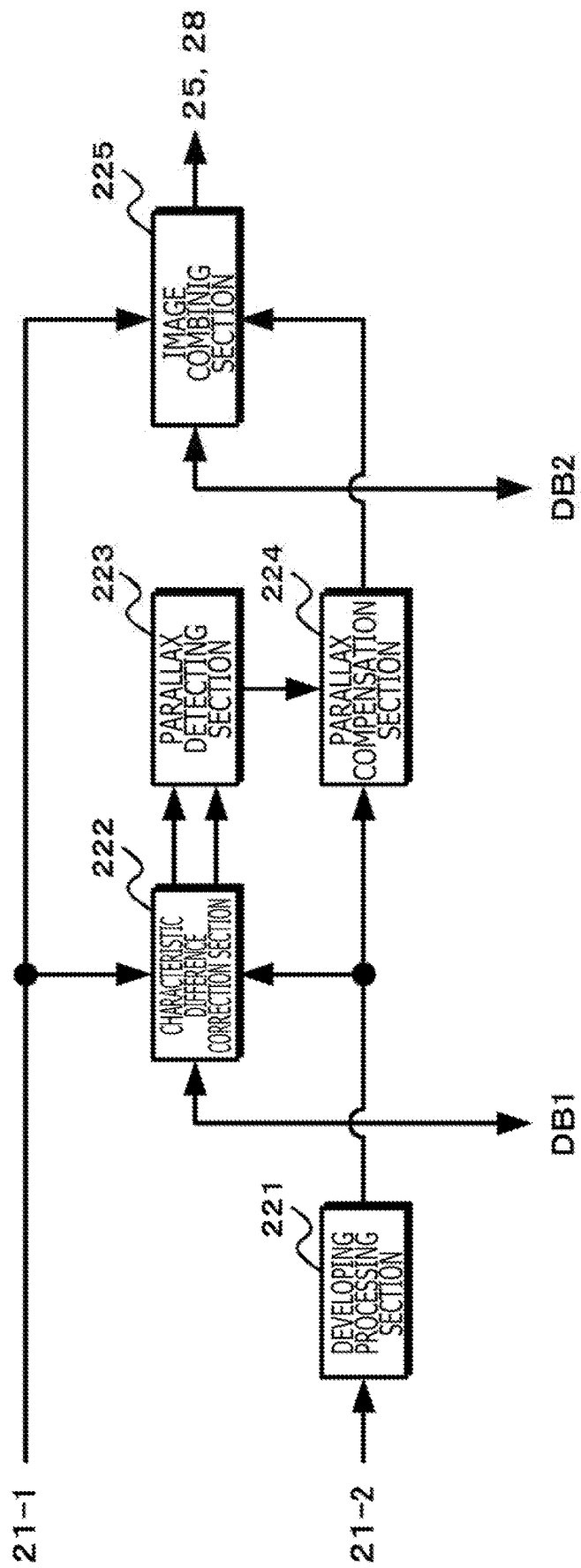
FIG. 3 is a diagram depicting an example of a configuration of an image processing section.

FIG. 3 depicts an example of a configuration of the image processing section. The image processing section 22 performs image processing using the image data generated by the imaging sections 21-1 and 21-2, and generates the image data on the captured image having the improved performance, compared with those of the captured images individually acquired by the imaging sections 21-1 and 21-2.

The image processing section 22 performs, as the image processing, characteristic difference correction processing using the image data generated by the imaging sections 21-1 and 21-2. In addition, the image processing section 22 performs parallax compensation because of a difference in a viewpoint position between the imaging sections 21-1 and 21-2. Furthermore, the image processing section 22 performs combining of the image data having been subjected to the characteristic difference correction processing and the parallax compensation. Description will be given hereinafter regarding a case in which the imaging section 21-1 generates image data on a captured black-and-white image, the imaging section 21-2 generates image data on a captured color image, and the image processing section 22 performs the image processing using the generated image data and generates image data on a captured color image having a higher image quality than that of the captured color image acquired by the imaging section 21-2.

FIG. 4 depicts an example of pixel arrays of the imaging sections. FIG. 4(*a*) depicts the pixel array of the imaging section 21-1. The imaging region 21-1 contains pixels all of which are configured with W (white) pixels each outputting an electrical signal based on an amount of incident light in all wavelength ranges of visible light. Therefore, the imaging section 21-1 generates the image data on the captured black-and-white image.

FIG. 4(*b*) depicts the pixel array of the imaging section 21-2. The imaging section 21-2 is configured using color filters with red (G) pixels, blue (B) pixels, and green (G) pixels in a Bayer array. In the Bayer array, two pixels at diagonal positions are green (G) pixels and remaining pixels at diagonal positions are a red (R) pixel and a blue (B) pixel in each pixel unit of 2×2 pixels. In the imaging section 21-2, each pixel generates an electrical signal based on an amount of incident light of a color component which is any one of red, blue, and green components. In other words, the imaging section 21-2 generates image data on a captured color image in three primary colors (RGB).

The image processing section 22 has a developing processing section 221, a characteristic difference correction section 222, a parallax detecting section 223, a parallax compensation section 224, and an image combining section 225.

The developing processing section 221 performs developing processing using the image data on the captured color image generated by the imaging section 21-2. In the developing processing, the developing processing section 221 performs demosaicing processing for generating image data that indicates color components of red, blue, and green components at each pixel from the image data that indicates one color component that is any one of red, blue, and green components at each pixel. In addition, in the developing processing, the developing processing section 221 performs white balance processing for adjusting the image data on each color component such that a white subject can be displayed in white. The developing processing section 221 outputs the image data having been subjected to the developing processing to the characteristic difference correction section 222 and the parallax detecting section 223.

The characteristic difference correction section 222 follows a learning model making characteristics of student data identical to those of teacher data, assuming one of image data on a learning image generated by the imaging section 21-1 and image data on the learning image generated by the imaging section 21-2 and different in characteristics as the teacher data and the other image data as the student data. In accordance with the learning model, the characteristic difference correction section 222 corrects one image data having a lower image quality performance out of the image data on the captured images generated by the imaging sections 21-1 and 21-2 to image data having a higher image quality performance. For example, the characteristic difference correction parameter generation section 222 performs characteristic difference correction using characteristic difference correction parameters generated in advance by learning in such a manner as to eliminate a characteristic difference between the image data on the captured black-and-white image supplied from the imaging section 21-1 and the image data on the captured color image supplied from the developing processing section 221.

The characteristic difference correction section 222 performs, as the characteristic difference correction, for example, correction of a color space difference and correction of a band difference (characteristic differences in a resolution and a sensitivity). In color space correction, the characteristic difference correction section 222 acquires a characteristic difference correction parameter from a database section DB1 in response to the image data supplied from, for example, the developing processing section 221. In addition, the characteristic difference correction section 222 performs the characteristic difference correction processing for correcting the color space of the image data supplied from the developing processing section 221 to that of the image data supplied from the imaging section 21-1 using the acquired characteristic difference correction parameter. In resolution characteristic difference correction, the characteristic difference correction section 222 acquires a characteristic difference correction parameter from the database section DB1 in response to the image data supplied from, for example, the imaging section 21-1. In addition, the characteristic difference correction section 222 performs the characteristic difference correction for correcting the resolution of the image data supplied from the imaging section 21-1 to that of the image data supplied from the developing processing section 221 using the acquired characteristic difference correction parameter. Furthermore, in sensitivity characteristic difference correction, the characteristic difference correction section 222 acquires a characteristic difference correction parameter from the database section DB1 in response to the image data supplied from, for example, the developing processing section 221. In addition, the characteristic difference correction section 222 performs the characteristic difference correction for correcting the sensitivity of the image data supplied from the developing processing section 221 to that of the image data supplied from the imaging section 21-1 using the acquired characteristic difference correction parameter. Moreover, in a case in which the parallax compensation section 224, to be described later, performs the parallax compensation on one of the image data generated by the imaging sections 21-1 and 21-2, the characteristic difference correction section 222 corrects the resolution of the other image data to that of the image data subjected to the parallax compensation. The characteristic difference correction section 222 outputs each of the characteristic-difference-corrected image data to the parallax detecting section 223. It is assumed that the image data from the imaging section 21-1 is parallax-detection first image data and the image data from the developing processing section 221 is parallax-detection second image data in the image data made identical in characteristics. In addition, it is assumed that an image based on the parallax-detection first image data is a parallax-detection first captured image and an image based on the parallax-detection second image data is a parallax-detection second captured image.

The parallax detecting section 223 generates parallax information that indicates a parallax between the parallax-detection first captured image and the parallax-detection second captured image on the basis of the characteristic-difference-corrected, parallax-detection first image data and the characteristic-difference-corrected, parallax-detection second image data. Since the imaging sections 21-1 and 21-2 perform imaging from different viewpoints as depicted in FIG. 1(b), the captured images based on the image data generated by the imaging sections 21-1 and 21-2, that is, the parallax-detection first captured image and the parallax-detection second captured image have the parallax therebetween. Therefore, the parallax detecting section 223 performs corresponding point, detection processing such as block matching using the parallax-detection first image data and the parallax-detection second image data, generates the parallax information that indicates the parallax per pixel, and outputs the generated parallax information to the parallax compensation section 224 to compensate for the parallax.

The parallax detecting section 223 assumes, for example, any one of the parallax-detection first captured image and the parallax-detection second captured image as a reference captured image, and detects a block region on the other captured image most similar to a reference block region with a position of interest on the reference captured image as a reference. The parallax detecting section 223 determines a position difference between the detected block region and the reference block region as the parallax. In addition, the parallax detecting section 223 calculates the parallax with each pixel on the reference captured image as the position of interest, and generates the parallax information that indicates the parallax calculated per pixel.

The parallax compensation section 224 performs the parallax compensation of the captured image based on the image data generated by the imaging section 21-2 on the basis of the parallax information. The parallax compensation section 224 moves a pixel location for the image data supplied from the developing processing section 221 on the basis of the parallax information, and generates image data that indicates a captured image similar to the image captured from the viewpoint of the imaging section 21-1. The parallax compensation section 224 outputs the generated image data to the image combining section 225.

The image combining section 225 follows a learning model for making characteristics of combined data of a plurality of pieces of student data identical to those of teacher data, assuming image data on a learning image as the teacher data and image data on learning images generated by the imaging sections 21-1 and 21-2 as the student data. In accordance with the learning model, the image combining section 225 combines the image data supplied from the imaging section 21-1 with the image data obtained by performing the parallax compensation in the parallax compensation section 224 on the image data generated by the imaging section 21-2 using a combining control parameter generated in advance by learning, for example, for making the characteristics of the combined data of the plurality of pieces of student data identical to those of the teacher data. The image combining section 225 acquires a combining control parameter for performing combining processing, for example, for maximizing the band in response to the image data generated by the imaging section 21-1 and the image data supplied from the parallax compensation section 224, from the combining control parameter acquired in advance by learning, from a database section DB2. The image combining section 225 combines the image data supplied from the imaging section 21-1 with the image data supplied from the parallax compensation section 224 at a combining ratio indicated by the acquired combining control parameter, and generates image data having a higher performance than those of the captured images acquired by the imaging sections 21-1 and 21-2.

3. Configuration of Learning Device

A configuration of a learning device used at a time of generating parameters used by the image processing section in advance will next be described.

<3-1. Case of Generating Characteristic Difference Correction Parameters>

Figure 5:
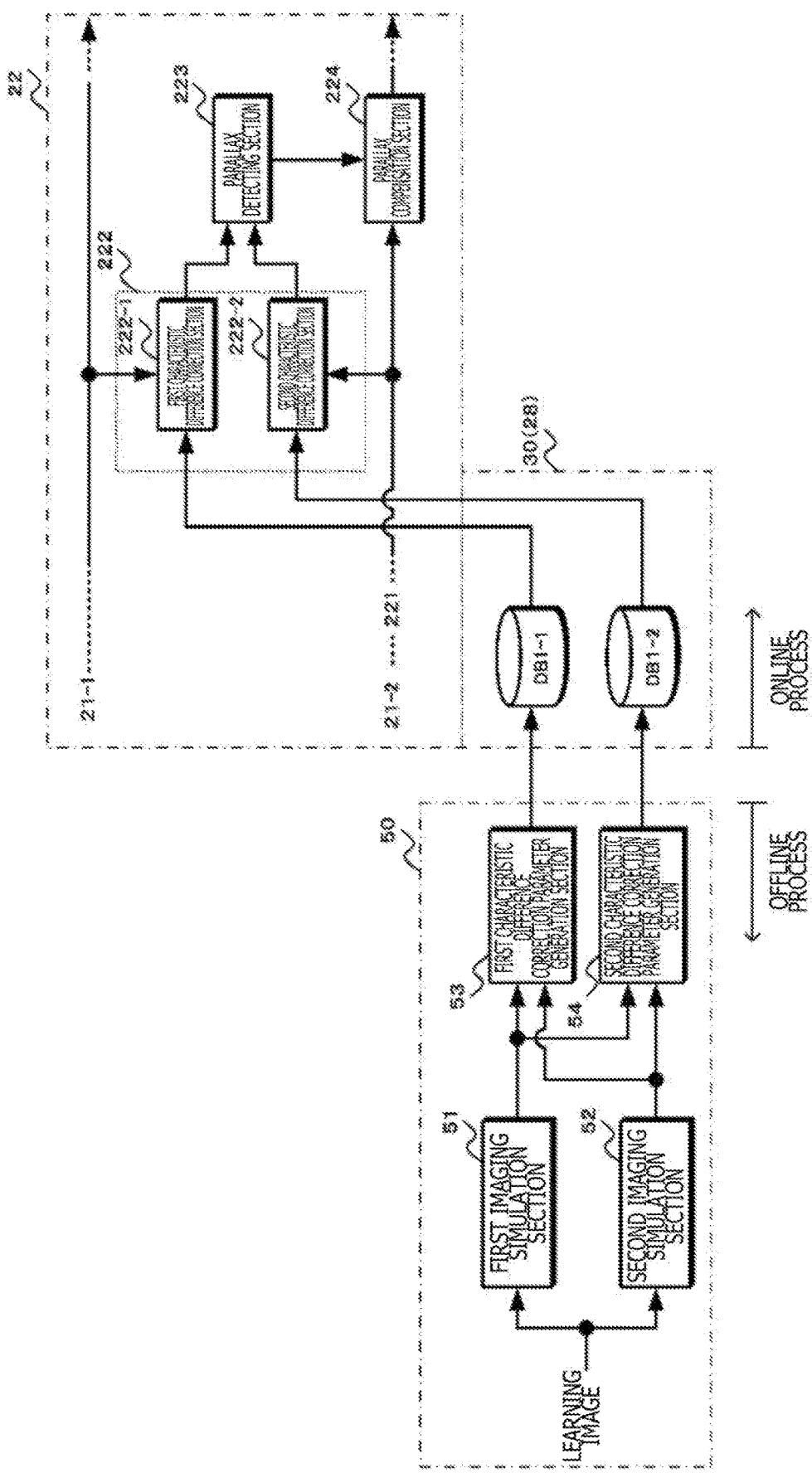
FIG. 5 is a diagram depicting an example of a configuration of a learning device in a case of generating characteristic difference correction parameters.

FIG. 5 depicts an example of a configuration of the learning device in a case of generating the characteristic difference correction parameters. A learning device 50 has a first imaging simulation section 51, a second imaging simulation section 52, a first characteristic difference correction parameter generation section 53, and a second characteristic difference correction parameter generation section 54.

The image data on the learning image is supplied to the first imaging simulation section 51 and the second imaging simulation section 52.

The first imaging simulation section 51 simulates, for example, imaging characteristics of the imaging section 21-1, and generates image data indicating a learning image captured by the imaging section 21-1 on the basis of the image data on the learning image. The first imaging simulation section 51 outputs the generated image data to the first characteristic difference correction parameter generation section 53 as the student data. In addition, the first imaging simulation section 51 outputs the generated image data to the second characteristic difference correction parameter generation section 54 as the teacher data.

The second imaging simulation section 52 simulates, for example, imaging characteristics of the imaging section 21-2, and generates image data indicating a learning image captured by the imaging section 21-2 on the basis of the image data on the learning image. The second imaging simulation section 52 outputs the generated image data to the second characteristic difference correction parameter generation section 54 as the student data. In addition, the second imaging simulation section 52 outputs the generated image data to the first characteristic difference correction parameter generation section 53 as the teacher data.

The first characteristic difference correction parameter generation section 53 performs learning using the teacher data and the student data, and calculates a characteristic difference correction parameter for generating image data equivalent to the teacher data from the student data. To classify a pixel of interest in a student image indicated by the student data, the first characteristic difference correction parameter generation section 53 extracts pixels in a feature amount calculation target region with the pixel of interest as a reference from the student image, and calculates a feature amount from image data on the extracted pixels. In addition, the first characteristic difference correction parameter generation section 53 classifies the pixel of interest on the basis of the calculated feature amount and calculates a prediction coefficient per class. The first characteristic difference correction parameter generation section 53 extracts pixels of a prediction tap with the pixel of interest as the reference from the student image in the calculation of the prediction coefficient. In addition, the first characteristic difference correction parameter generation section 53 calculates a prediction coefficient at which a difference between accumulated data obtained by accumulating multiplication results of pixel data on the prediction tap and the prediction coefficients, and pixel data on the teacher image corresponding to the pixel of interest becomes the smallest. The first characteristic difference correction parameter generation section 53 stores the prediction coefficient calculated per class into a database section DB1-1 as the characteristic difference correction parameter. In other words, the characteristic difference correction parameters for generating, by a first characteristic difference correction section 222-1 in the characteristic difference correction section 222, the image data equivalent in characteristics to the image data generated by the imaging section 21-2 from the image data generated by the imaging section 21-1 are stored in the database section DB1-1.

The second characteristic difference correction parameter generation section 54 performs learning using the teacher data and the student data similarly to the first characteristic difference correction parameter generation section 53, and calculates a characteristic difference correction parameter for generating image data equivalent to the teacher data from the student data. To classify a pixel of interest in a student image indicated by the student data, the second characteristic difference correction parameter generation section 54 extracts pixels in a feature amount calculation target region with the pixel of interest as a reference from the student image, and calculates a feature amount from image data on the extracted pixels. In addition, the second characteristic difference correction parameter generation section 54 classifies the pixel of interest on the basis of the calculated feature amount and calculates a prediction coefficient per class. The second characteristic difference correction parameter generation section 54 extracts pixels of a prediction tap with the pixel of interest as the reference from the student image in the calculation of the prediction coefficient. In addition, the second characteristic difference correction parameter generation section 54 calculates a prediction coefficient at which a difference between accumulated data obtained by accumulating multiplication results of pixel data on the prediction tap and the prediction coefficients, and pixel data on the teacher image corresponding to the pixel of interest becomes smallest. The second characteristic difference correction parameter generation section 54 stores the prediction coefficient calculated per class into a database section DB1-2 as the characteristic difference correction parameter. In other words, the characteristic difference correction parameters for generating, by a second characteristic difference correction section 222-2 in the characteristic difference correction section 222, the image data equivalent in characteristics to the image data generated by the imaging section 21-1 from the image data generated by the imaging section 21-2 are stored in the database section DB1-2.

In the classification of the pixel of interest performed by the learning device 50, a dynamic range of the pixel data in the feature amount calculation target region, average pixel data in the feature amount calculation target region, or a noise amount (standard deviation) of pixels in the feature amount calculation target region, for example, may be used as the feature amount. Alternatively, an image height of the pixel of interest may be used as the feature amount. In another alternative, re-quantized data obtained by performing adaptive dynamic range coding (ADRC) using the pixel data in the feature amount calculation target region may be used as the feature amount.

<3-2. Case of Generating Combining Control Parameter>

Figure 6:
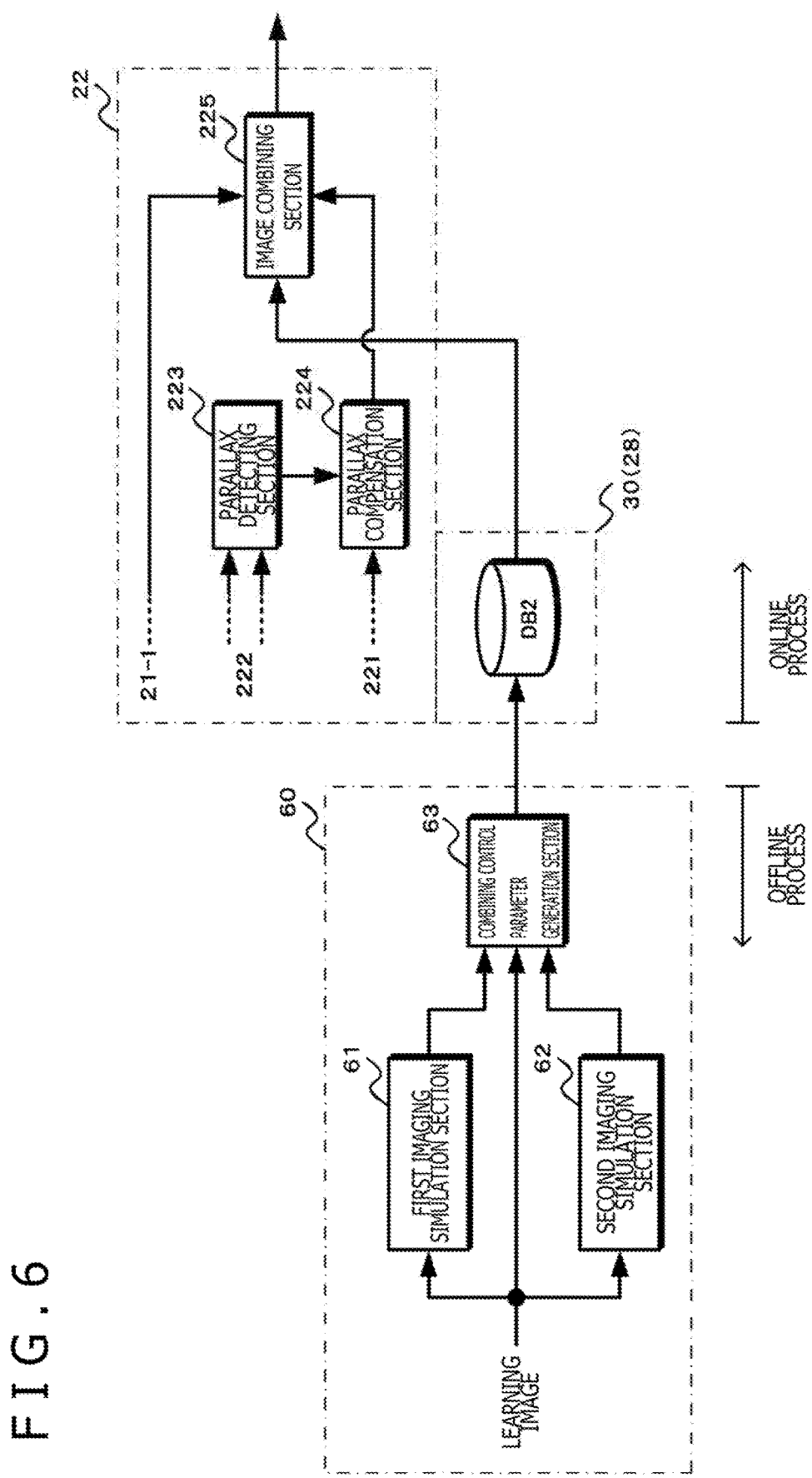
FIG. 6 is a diagram depicting an example of a configuration of a learning device in a case of generating a combining control parameter.

FIG. 6 depicting an example of a configuration of a learning device in a case of generating the combining control parameter. A learning device 60 has a first imaging simulation section 61, a second imaging simulation section 62, and a combining control parameter generation section 63.

The image data on the learning image is supplied to the first imaging simulation section 61 and the second imaging simulation section 62. In addition, the image data on the learning image is supplied to the combining control parameter generation section 63 as the teacher data.

The first imaging simulation section 61 simulates, for example, imaging characteristics of the imaging section 21-1, and generates image data indicating a learning image captured by the imaging section 21-1 on the basis of the image data on the learning image. The first imaging simulation section 51 outputs the generated image data to the combining control parameter generation section 63 as the student data.

The second imaging simulation section 62 simulates, for example, imaging characteristics of the imaging section 21-2, and generates image data indicating a learning image captured by the imaging section 21-2 on the basis of the image data on the learning image. The second imaging simulation section 62 outputs the generated image data to the combining control parameter generation section 63 as the student data.

The combining control parameter generation section 63 performs learning using the teacher data and the student data, and calculates a combining control parameter for generating image data having a smallest characteristic difference from the teacher data at a time of combining the student data supplied from the first imaging simulation section 61 with the student data supplied from the second imaging simulation section 62. To classify a pixel of interest in a student image indicated by each student data, the combining control parameter generation section 63 extracts, for example, pixels in a feature amount calculation target region with the pixel of interest as a reference from each of the two student images, and calculates a feature amount from image data on the extracted pixels. In addition, the combining control parameter generation section 63 classifies the pixel of interest on the basis of each of the calculated feature amounts and calculates a combining ratio per class.

The combining control parameter generation section 63 extracts a prediction tap from each of the student images with the pixel of interest as the reference in the calculation of the combining ratio. In addition, the combining control parameter generation section 63 calculates accumulated data obtained by accumulating multiplication results of the pixel data on the prediction tap and the prediction coefficients per student image, and calculates a prediction coefficient at which a characteristic difference between an addition result of the accumulated data calculated per student image and the image data on a teacher image corresponding to the pixel of interest becomes smallest. In addition, the combining control parameter generation section 63 stores the prediction coefficient calculated per class into the database section DB2 as the combining control parameter. In other words, the combining control parameters indicating the combining ratio for generating image data most similar to the learning image by combining the image data generated by the imaging section 21-1 with the image data generated by the imaging section 21-2 are stored in the database section DB2.

In the classification of the pixel of interest performed by the learning device 60, a dynamic range of the pixel data in the feature amount calculation target region, average pixel data in the feature amount calculation target region, or a noise amount (standard deviation) of pixels in the feature amount calculation target region, for example, may be used as the feature amount. Alternatively, an image height of the pixel of interest may be used as the feature amount. In another alternative, re-quantized data obtained by performing adaptive dynamic range coding (ADRC) using the pixel data in the feature amount calculation target region may be used as the feature amount. Furthermore, in a case of occurrence of misalignment of the captured images to be combined, an image quality of the combined image is possibly deteriorated, compared with an image quality before combining; thus, a difference in pixel data at each pixel location between the captured images to be combined may be used as the feature amount.

4. Operations Performed by Learning Device and Image Processing Section

Figure 7:
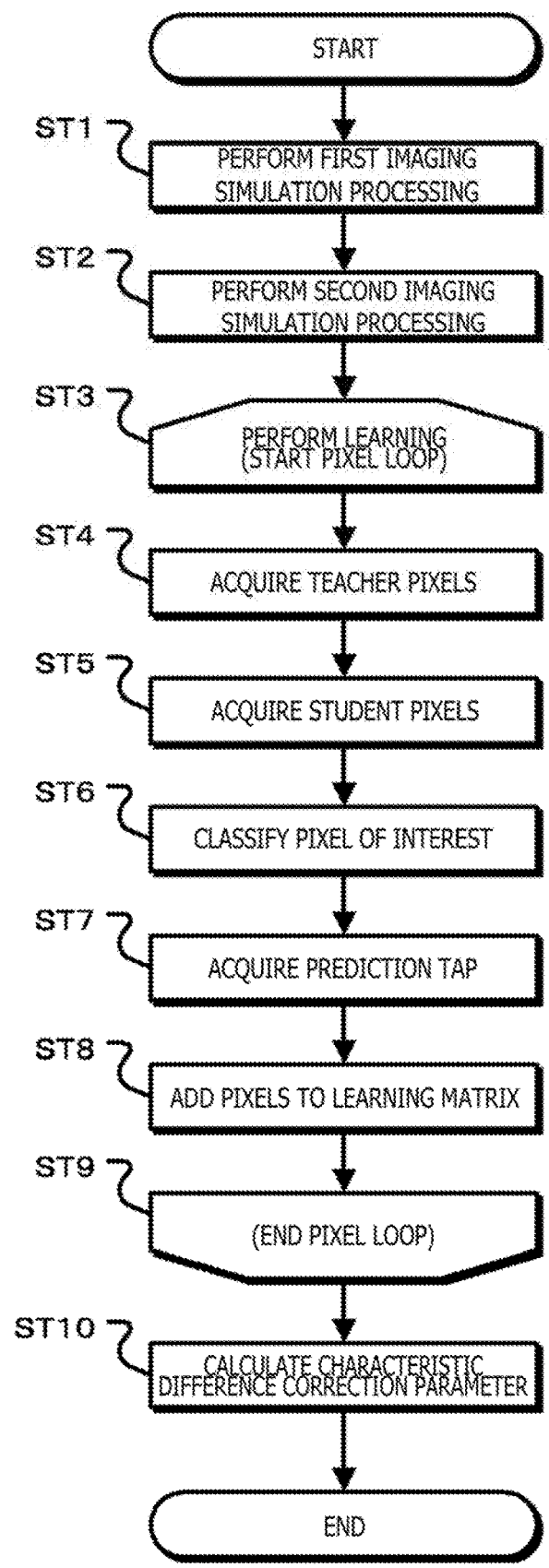
FIG. 7 is a flowchart depicting an example of an operation performed by the learning device generating the characteristic difference correction parameters.
Figure 8:
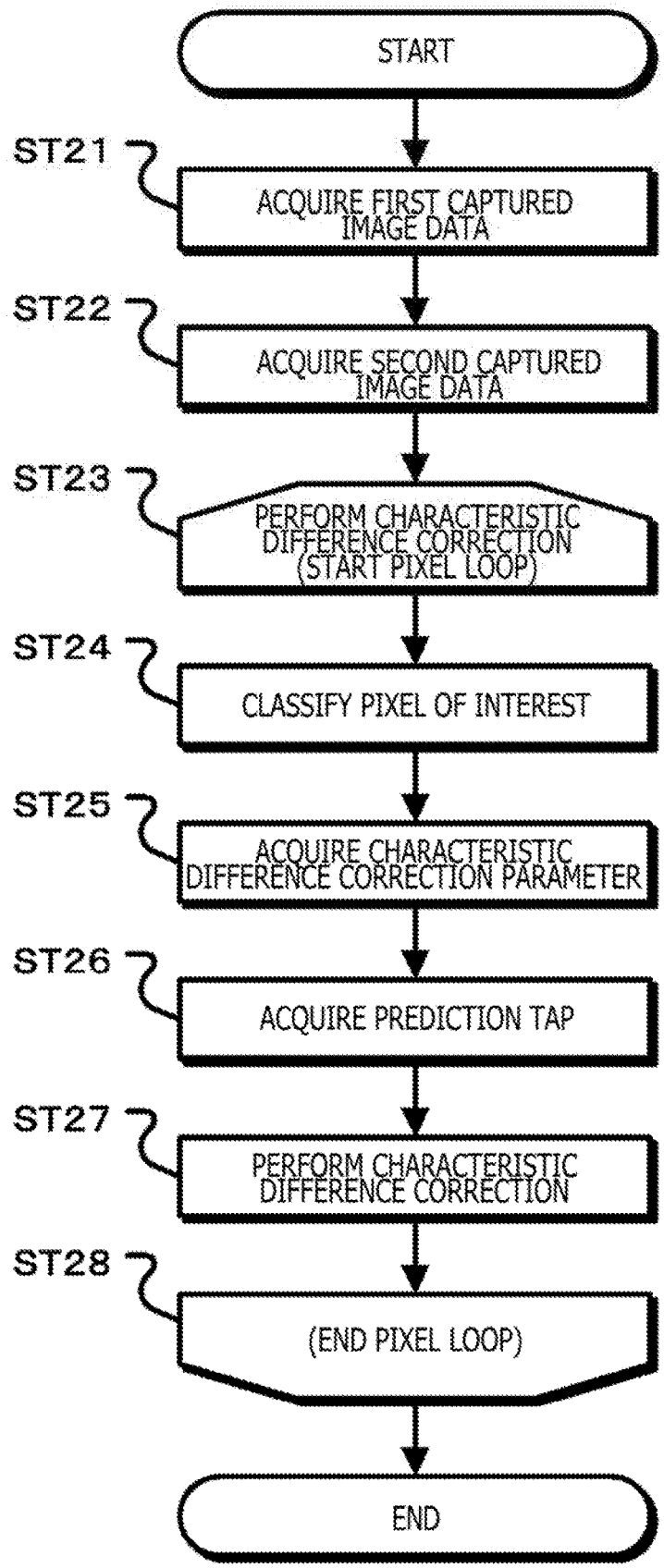
FIG. 8 is a flowchart depicting an example of an operation performed by a characteristic difference correction section.

FIG. 7 is a flowchart depicting an example of an operation performed by the learning device generating the characteristic difference correction parameters, and FIG. 8 is a flowchart depicting an example of an operation performed by the characteristic difference correction section.

In Step ST1 of FIG. 7, the learning device performs first imaging simulation processing. The learning device 50 generates first simulated image data identical in performance to the image data generated by the imaging section 21-1 from the image data on the learning image, and the operation goes to Step ST2.

In Step ST2, the learning device performs second imaging simulation processing. The learning device 50 generates second simulated image data identical in performance to the image data generated by the imaging section 21-2 from the image data on the learning image, and the operation goes to Step ST3.

In Step ST3, the learning device starts a pixel loop performing learning of the characteristic difference correction parameter, and the operation goes to Step ST4.

In Step ST4, the learning device acquires teacher pixels. The learning device 50 acquires pixel data on the pixel of interest from the first simulated image data or the second simulated image data serving as the teacher data, and the operation goes to Step ST5.

In Step ST5, the learning device acquires student pixels. The learning device 50 acquires pixel data in the feature amount calculation target region with the pixel of interest as the reference from the first simulated image data or the second simulated image data serving as the student data different from the teacher data, and the operation goes to Step ST6.

In Step ST6, the learning device classifies the pixel of interest. The learning device 50 calculates the feature amount of the pixel of interest from the pixel data in the feature amount calculation target region acquired in Step ST5 and classifies the pixel of interest on the basis of the calculated feature amount, and the operation goes to Step ST7.

In Step ST7, the learning device acquires the prediction tap. The learning device 50 acquires pixel data on the prediction tap with the pixel of interest as the reference from the student data, and the operation goes to Step ST8.

In Step ST8, the learning device adds pixels to a learning matrix. The learning device 50 adds the pixels to the learning matrix, for example, a normal equation using the pixel data on the pixel of interest in the teacher data acquired in Step ST4 and the pixel data on the prediction tap acquired in Step ST7. It is noted that the normal equation is provided per class of the pixel of interest.

In Step ST9, the learning device ends the pixel loop. In a case of addition to the learning matrix with each pixel in the learning image as the pixel of interest, the learning device 50 ends the pixel loop, and the operation goes to Step ST10. In addition, in a case in which a pixel not completed with addition to the normal equation remains, the operation then returns to Step ST6, a new pixel that is not set as the pixel of interest in the learning image is set as the pixel of interest, and the learning device performs processing from Steps ST6 to ST8.

In Step ST10, the learning device calculates the characteristic difference correction parameter. The learning device 50 calculates an inverse matrix for the learning matrix per class to determine the inverse matrix as the prediction coefficient. The learning device 50 calculates, for example, a solution of a coefficient of the normal equation completed with addition and determines the calculated coefficient as the prediction coefficient. In addition, the learning device 50 stores the prediction coefficient calculated per class in the database section DB1 as the characteristic difference correction parameter.

In Step ST21 of FIG. 8, the image processing section acquires first captured image data. The characteristic difference correction section 222 in the image processing section 22 acquires the image data generated by the imaging section 21-1 as the first captured image data, and the operation goes to Step ST22.

In Step ST22, the image processing section acquires second captured image data. The characteristic difference correction section 222 in the image processing section 22 acquires the image data generated by the imaging section 21-2 to perform developing processing on the acquired image data, and acquires the developing-processed image data as the second captured image data, and the operation goes to Step ST23.

In Step ST23, the image processing section starts a pixel loop performing the characteristic difference correction, and the operation goes to Step ST24.

In Step ST24, the image processing section classifies the pixel of interest. The characteristic difference correction section 222 in the image processing section 22 acquires pixel data in the feature amount calculation target region with the pixel of interest as the reference from the first captured image data or the second captured image data to be subjected to the characteristic difference correction, and calculates the feature amount of the pixel of interest from the acquired image data. In addition, the characteristic difference correction section 222 classifies the pixel of interest on the basis of the calculated feature amount, and the operation goes to Step ST25.

In Step ST25, the image processing section acquires the characteristic difference correction parameter. The characteristic difference correction section 222 in the image processing section 22 acquires the characteristic difference correction parameter corresponding to a classification result of Step ST25 from the database section DB1, and the operation goes to Step ST26.

In Step ST26, the image processing section acquires the prediction tap. The characteristic difference correction section 222 in the image processing section 22 acquires pixel data on the prediction tap with the pixel of interest as the reference from the captured image data subjected to the characteristic difference correction, and the operation goes to Step ST27.

In Step ST27, the image processing section performs the characteristic difference correction. The characteristic difference correction section 222 in the image processing section 22 performs prediction arithmetic operation using the prediction coefficient indicated by the characteristic difference correction parameter acquired in Step ST26 and the pixel data on the prediction tap, and calculates the pixel data for which the characteristic difference of the pixel of interest has been corrected, and the operation goes to Step ST28.

In Step ST28, the image processing section ends the pixel loop. In a case of having calculated the pixel data for which the characteristic difference has been corrected with each pixel in the images to be subjected to the characteristic difference correction as the pixel of interest, the characteristic difference correction section 222 in the image processing section 22 ends the pixel loop. In addition, in a case in which the pixel for which characteristic difference-corrected pixel data is not calculated remains, the operation then returns to Step ST24, a new pixel that is not set as the pixel of interest in the images to be subjected to the characteristic difference correction is set as the pixel of interest, and the image processing section 22 performs processing from Steps ST24 to ST27.

Figure 9:
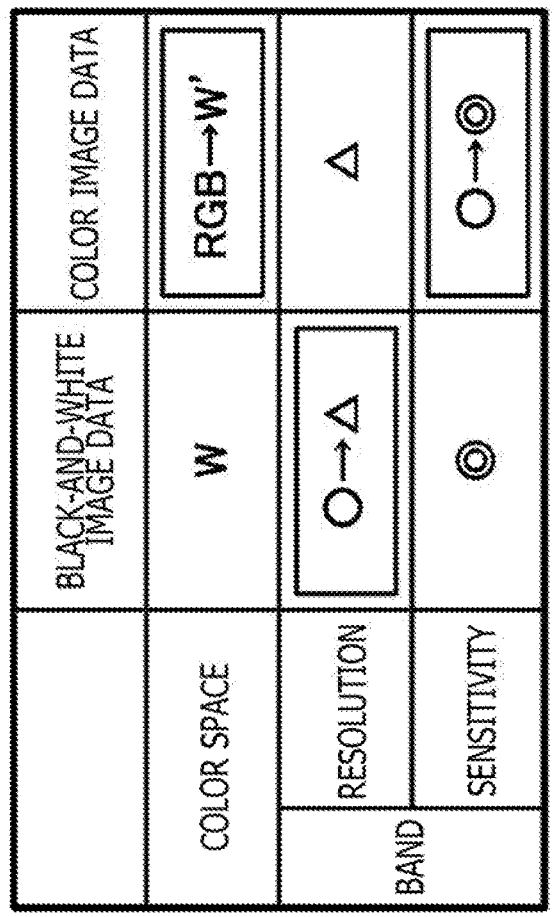
FIG. 9 is a diagram depicting a characteristic difference correction operation performed by an image processing section.

FIG. 9 depicts the characteristic difference correction operation performed by the image processing section. FIG. 9 depicts an example of a case of correcting the color space and the band (resolution and sensitivity) as the characteristic difference, and a double-circle mark, a circle mark, and a triangle mark are used in descending order of performance. In addition, in FIG. 9, a direction of correction is denoted by an arrow. For example, correction processing for making the color space and the sensitivity of the image data generated by the imaging section 21-2 identical to those of the image data generated by the imaging section 21-1 is performed. In addition, correction processing for making the resolution of the image data generated by the imaging section 21-1 identical to that of the image data generated by the imaging section 21-2 is performed. It is noted that the characteristic difference correction operation is intended to generate the image data used for parallax detection, and that making the resolution of the image data generated by the imaging section 21-1 identical to that of the image data generated by the imaging section 21-2 makes it possible to perform optimum parallax compensation on the captured color image.

Figure 10:
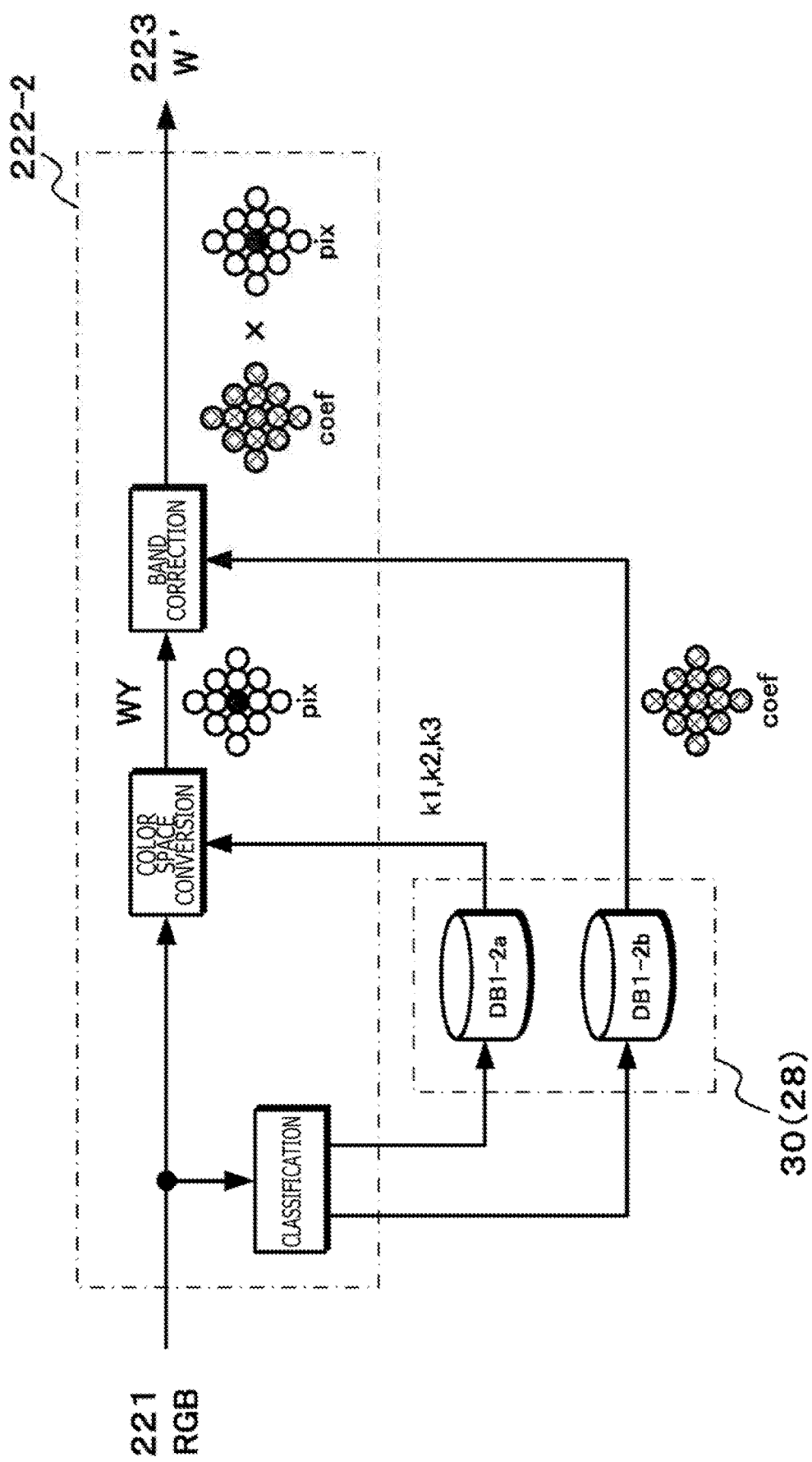
FIG. 10 is a diagram depicting an example of characteristic difference correction processing performed by a second characteristic difference correction section.

FIG. 10 depicts an example of the characteristic difference correction processing performed by the second characteristic difference correction section. It is noted that prediction coefficients for performing color space conversion are stored in a database section DB1-2a by Learning in advance. In addition, a prediction coefficient for performing band correction is stored in a database section DB1-2b by learning in advance.

The second characteristic difference correction section 222-2 performs the color space conversion and the band correction. In the color space conversion, the second characteristic difference correction section 222-2 performs arithmetic operation represented by Equation (1) using the image data supplied from the developing processing section 221 and indicating RGB components and prediction coefficients k1, k2, and k3 acquired from the database section DB1-2a in response to a classification result of the image of interest. The second characteristic difference correction section 222-2 performs such arithmetic operation to generate image data WY indicating a W (white) component.

$$WY = k1 \times R + k2 \times G + k3 \times B \quad (1)$$

In the band correction, the second characteristic difference correction section 222-2 acquires, for example, prediction taps in two-dimensional directions with the pixel of interest as a reference from image data WY, and acquires a two-dimensional filter coefficient that is the prediction coefficient from the database section DB1-2b in response to the classification result of the image of interest. The second characteristic difference correction section 222-2 then performs convolution arithmetic operation on the prediction tap and the coefficient as depicted in Equation (2) using the acquired prediction tap pix(i) and the two-dimensional filter coefficient coef(i), and generates characteristic-difference-corrected pixel data W' on the pixel of interest. It is noted that "n" indicates the number of taps in Equation (2).

[Math. 1]

$$W' = \Sigma_{i=1}^{n} \text{coef}(i) \times \text{pix}(i) \quad (2)$$

FIG. 11 schematically depicts a characteristic difference correction result for the color space. FIG. 11(a) typically depicts a relation between a wavelength and a sensitivity of each of the W (white) component of the captured image indicated by the image data generated by the imaging section 21-1, and the R (red) component, the G (green) component, and the B (blue) component of the captured image indicated by the image data generated by the imaging section 21-2.

FIG. 11(b) is a diagram by adding a relation between the wavelength and the sensitivity of a Y (luminance) component calculated from the R component, the G component, and the B component using a color space conversion equation to FIG. 11(a).

FIG. 11(c) is a diagram by adding a relation between the wavelength and the sensitivity of a W' (white) component calculated using the characteristic difference correction parameter generated in advance by learning to FIG. 11(a).

As depicted in FIG. 11(b), the Y component calculated using the color space conversion equation differs in characteristics from the H component. It is, therefore, supposed that, in a case of performing parallax detection using image data on the W component and image data on the Y component calculated using the color space conversion equation, accurate parallax detection may not be carried out due to a difference in sensitivity relative to the wavelength. However, as depicted in FIG. 11(*c*), characteristics of the W' component calculated using the characteristic difference correction parameter generated in advance by learning are corrected to characteristics similar to the W component. It is, therefore, possible to improve a parallax detection performance, compared with a case of using the image data on the Y component calculated using the color space conversion equation.

Figure 12:
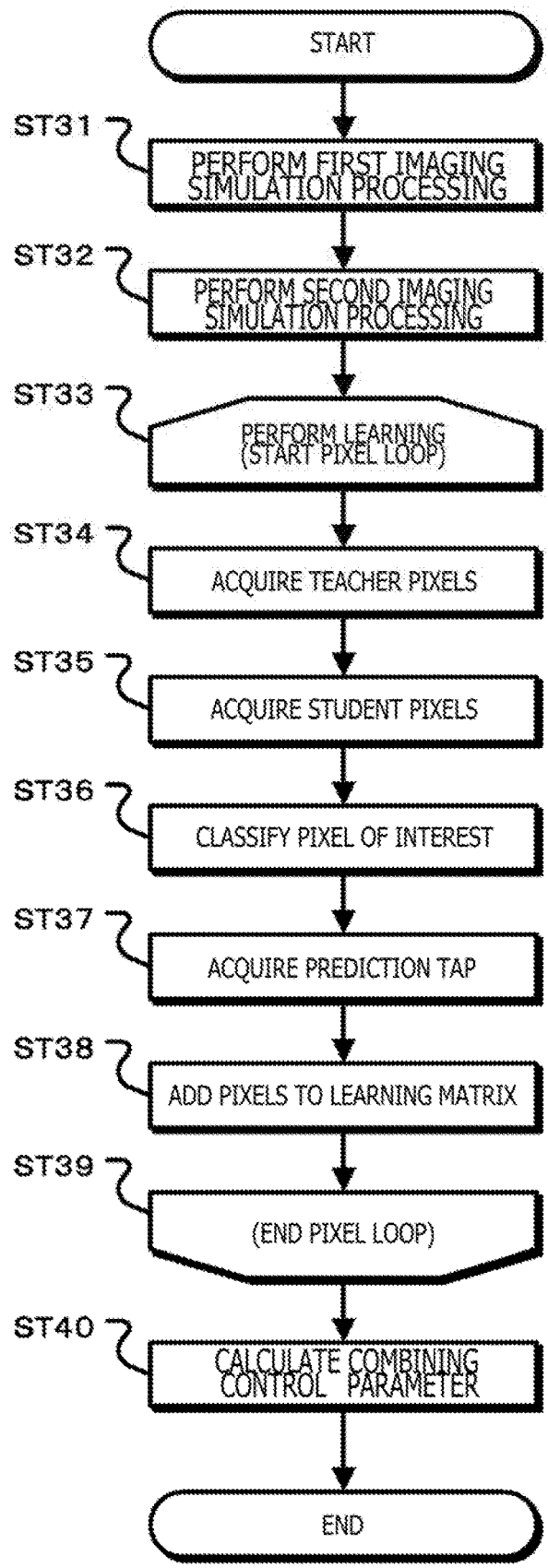
FIG. 12 is a flowchart depicting an example of an operation performed by the learning device for generating the combining control parameter.
Figure 13:
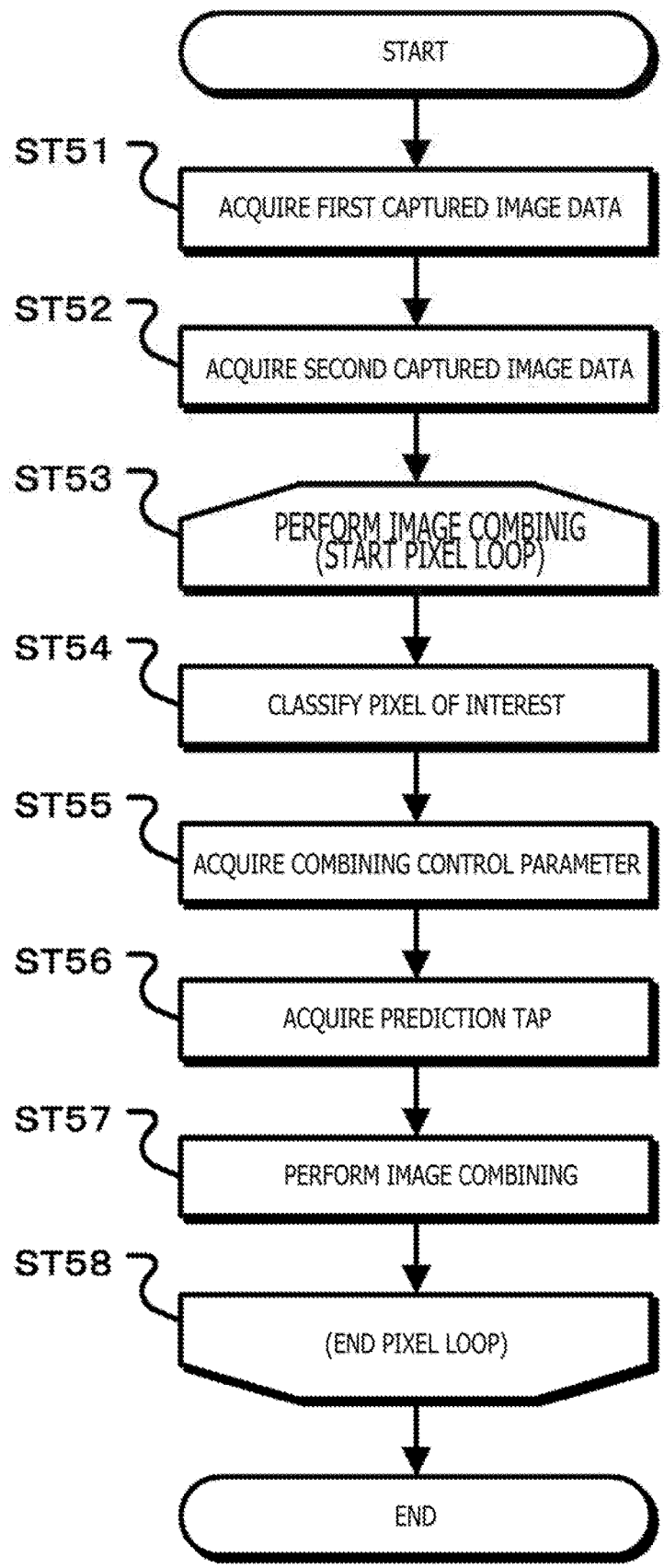
FIG. 13 is a flowchart depicting an example of an operation performed by an image combining section.

An operation performed by the learning device and an operation performed by the image combining section generating the combining control parameter will next be described. FIG. 12 is a flowchart depicting an example of an operation performed by the learning device generating the combining control parameter, and FIG. 13 is a flowchart depicting an example of an operation performed by the image combining section.

In Step S31 of FIG. 12, the learning device performs first imaging simulation processing. The learning device 60 generates the first simulated image data identical in performance to the image data generated by the imaging section 21-1 from the image data on the learning image, and the operation goes to Step ST32.

In Step ST32, the learning device performs second imaging simulation processing. The learning device 60 generates second simulated image data identical in performance to the image data generated by the imaging section 21-2 from the image data on the learning image, and the operation goes to Step ST33.

In Step ST33, the learning device starts a pixel loop performing learning of the combining control parameter, and the operation goes to Step ST34.

In Step ST34, the learning device acquires teacher pixels. The learning device 60 acquires pixel data on the pixel of interest from the teacher data that is the image data on the learning image, and the operation goes to Step ST35.

In Step ST35, the learning device acquires student pixels. The learning device 60 acquires pixel data in the feature amount calculation target region with the pixel of interest as the reference from each of the first simulated image data and the second simulated image data serving as the student data, and the operation goes to Step ST36.

In Step ST36, the learning device classifies the pixel of interest. The learning device 60 calculates the feature amount of the pixel of interest from the pixel data acquired in Step ST35 and classifies the pixel of interest on the basis of the calculated feature amount, and the operation goes to Step ST37.

In Step ST37, the learning device acquires the prediction tap. The learning device 60 acquires pixel data on the prediction tap with the pixel of interest as the reference from each of the student data, and the operation goes to Step ST38.

In Step ST38, the learning device adds pixels to a learning matrix. The learning device 60 adds the pixels to the learning matrix, for example, a normal equation using the pixel data on the pixel of interest in the teacher data acquired in Step ST34 and the pixel data on the prediction tap acquired in Step ST37, and the operation goes to Step ST39. It is noted that the normal equation is provided per class of the pixel of interest.

In Step ST39, the learning device ends the pixel loop. In a case of having added the pixels to the learning matrix with each pixel in the learning image as the pixel of interest, the learning device 60 ends the pixel loop, and the operation goes to Step ST40. In addition, in a case in which a pixel not completed with addition to the normal equation remains, the operation then returns to Step ST36, a new pixel that is not set as the pixel of interest in the learning image is set as the pixel of interest, and the learning device performs processing from Steps ST36 to ST38.

In Step ST40, the learning device calculates the combining control parameter. The learning device 60 calculates an inverse matrix for the learning matrix per class to determine the inverse matrix as the prediction coefficient. The learning device 60 calculates, for example, a solution of a coefficient of the normal equation completed with addition and determines the calculated coefficient as the prediction coefficient and the combining ratio. In addition, the learning device 60 stores the prediction coefficient calculated per class in the database section DB2 as the combining control parameter.

In Step ST51 of FIG. 13, the image processing section acquires first captured image data. The image combining section 225 in the image processing section 22 acquires the image data generated by the imaging section 21-1 as the first captured image data, and the operation goes to Step ST52.

In Step ST52, the image processing section acquires second captured image data. The image combining section 225 in the image processing section 22 acquires the image data generated by the imaging section 21-2 to perform developing processing on the acquired image data, and acquires the developing-processed image data as the second captured image data, and the operation goes to Step ST53.

In Step ST53, the image processing section starts a pixel loop performing the image combining, and the operation goes to Step ST54.

In Step ST54, the image processing section classifies the pixel of interest. The image combining section 225 in the image processing section 22 acquires pixel data in the feature amount calculation target region with the pixel of interest as the reference from each of the first captured image data and the second captured image data used for image combining, and calculates the feature amount of the pixel of interest from the acquired image data. In addition, the image combining section 225 classifies the pixel of interest on the basis of the calculated feature amount, and the operation goes to Step ST55.

In Step ST55, the image processing section acquires the combining control parameter. The image combining section 225 in the image processing section 22 acquires the combining control parameter corresponding to a classification result of Step ST54 from the database section DB2, and the operation goes to Step ST56.

In Step ST56, the image processing section acquires the prediction tap. The image combining section 225 in the image processing section 22 acquires pixel data on the prediction tap with the pixel of interest as the reference from each of the first captured image data and the second captured image data used for image combining, and the operation goes to Step ST57.

In Step ST57, the image processing section performs image combining. The image processing section 225 in the image processing section 22 performs convolution arithmetic operation using the prediction coefficient indicated by the combining control parameter acquired in Step ST55 and the pixel data on the prediction tap. In addition, the image combining section 225 adds up an arithmetic result of the convolution arithmetic operation at the combining ratio indicated by the combining control parameter, and calculates combined image data, and the operation goes to Step ST58. It is noted that the combined image data is image data on a combined image.

In Step ST58, the image processing section ends the pixel loop. In a case of having calculated a pixel combined value with each pixel in the first captured image data and the second captured image data used for image combining as the pixel of interest, the image combining section 225 in the image processing section 22 ends the pixel loop. In addition, in a case in which the pixel for which the pixel combined value is not calculated remains, the operation then returns to Step ST54, a new pixel that is not set as the pixel of interest is set as the pixel of interest, and the image combining section 225 performs processing from Steps ST54 to ST57.

FIG. 14 depicts an image combining operation performed by the image combining section. It is noted that FIG. 14 depicts an example of the color space and the band (resolution and sensitivity) as the performances, and a double-circle mark, a circle mark, and a triangle mark are used in descending order of performance. The image combining section 225 in the image processing section 22 perform combining processing pixel per using the combining control parameter generated in advance by learning, thereby generating combined image data that indicates RGB components obtained by combining, for example, the image data generated by the imaging section 21-1 with the image data generated by the imaging section 21-2. In addition, the image combining section 225 performs combining processing per pixel using the combining control parameter generated in advance by learning, thereby generating combined image data having a higher resolution than that of the image data generated by, for example, the imaging section 21-2. Furthermore, the image combining section 225 performs combining processing per pixel using the combining control parameter generated in advance by learning, thereby generating combined image data having a higher sensitivity than that of the image data generated by, for example, the imaging section 21-2.

Figure 15:
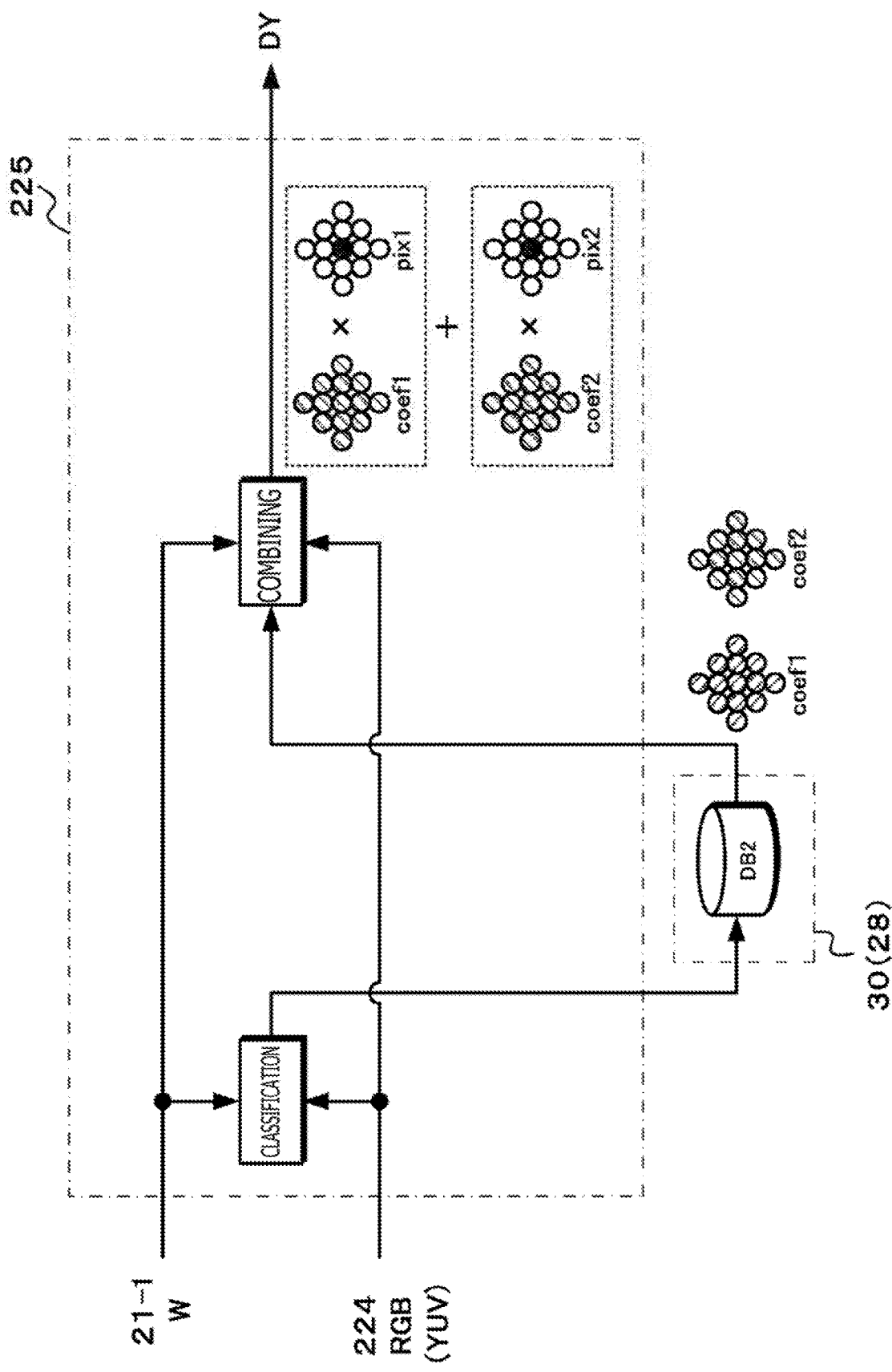
FIG. 15 is a diagram depicting an example of an image combining operation performed by the image combining section.

FIG. 15 depicts an example of the image combining operation performed by the image combining section. The image combining section 225 acquires, for example, the prediction taps in two-dimensional directions with the pixel of interest as the reference from image data (W) generated by the imaging section 21-1 and image data (RGB) from the developing processing section 221. In addition, the image combining section 225 acquires a combining ratio α in response to the classification result of the pixel of interest in each of the image data (W) and the image data (RGB) and the two-dimensional filter coefficients that are the prediction coefficients from the database section DB2. The image combining section 225 performs arithmetic operation represented by Equation (3) using the acquired prediction taps pix1($i$) and pix2($j$), the combining ratio α, and the two-dimensional filter coefficients coef1($i$) and coef2($j$). In other words, the image combining section 225 adds up the arithmetic result of the convolution arithmetic operation of the prediction taps and the prediction coefficients at the combining ratio to generate combined pixel data DY on the pixel of interest. It is noted that "n" indicates the number of taps in Equation (3).

[Math. 2]

$$DY = \alpha \times \Sigma_{i=1}^{n} \text{coef1}(i) \times \text{pix1}(i) + (1-\alpha) \times \Sigma_{j=1}^{n} \text{coef2}(j) \times \text{pix2}(j) \quad (3)$$

In addition, the combined image data generated by Equation (3) is image data that indicates a luminance (white) component; thus, the image combining section 225 performs color space conversion of the image data that is supplied from, for example, the developing processing section 221 and that indicates the RGB components to generate a U component and a V component, and outputs image data that indicates a DY component, the U component, and the V component. Furthermore, in a case of outputting image data identical in color space to the image data generated by the imaging section 21-2 from the image combining section 225, the image combining section 225 may generate image data that indicates RGB components from the image data that indicates the DY component, the U component, and the V component and may output the image data.

5. Modifications

Meanwhile, the embodiment described above has illustrated an example of the case of generating the captured color image higher in the resolution and the sensitivity than the captured color image generated by the imaging section 21-2 using the imaging section 21-2 generating the image data on the captured black-and-white image and the imaging section 21-2 generating the captured color image. However, the plurality of imaging sections and the generated captured images are not limited to the configurations described above.

FIG. 16 depicts an example of combination elements of a configuration and an operation of (captured images generated by) the imaging section. Examples of the elements that cause the characteristic difference related to the functional performance include the angle of view, the color array, exposure time, focus, and other elements. As for the angle of view, wide-angle captured images or telephoto captured images, for example, may be used. The color array is not limited to the Bayer array or an array of single white pixels described above but also may be an array in which pixels indicating any of primary colors and complementary colors, or an array in which pixels or the like sensitive to white or an infrared region are provided at primary color pixels. In addition, the color array may be a vertical spectroscopic array in which photoelectric conversion layers different in a wavelength range for photoelectric conversion are laminated in a light incidence direction. As for exposure time, captured images by long-time exposure, captured images by short-time exposure, or captured images having different exposure timing, for example, may be used. As for focus, captured images focusing on a foreground or captured images focusing on a background, for example, may be used. As for other elements, captured images different in the number of pixels, captured images different in pixel array, captured images different in a color temperature of a light source, captured images in a specific polarization direction, or the like may be used.

The image processing section performs the characteristic difference correction and the image combining by a combination of such elements, and can easily generate a combined image at a favorable image quality in accordance with the learning model in the characteristic difference correction and the image combining, compared with model-based combining processing. For example, the image processing section can generate a high dynamic range combined image at a favorable image quality by combining a plurality of captured images different in exposure time. In addition, the image processing section can generate a high frame rate image at a favorable image quality by aligning a plurality of captured images different in exposure timing in a time direction while making characteristics thereof uniform. Furthermore, the image processing section can generate a combined image with an improved color reproducibility by combining a plurality of captured images different in color array.

Figure 17:
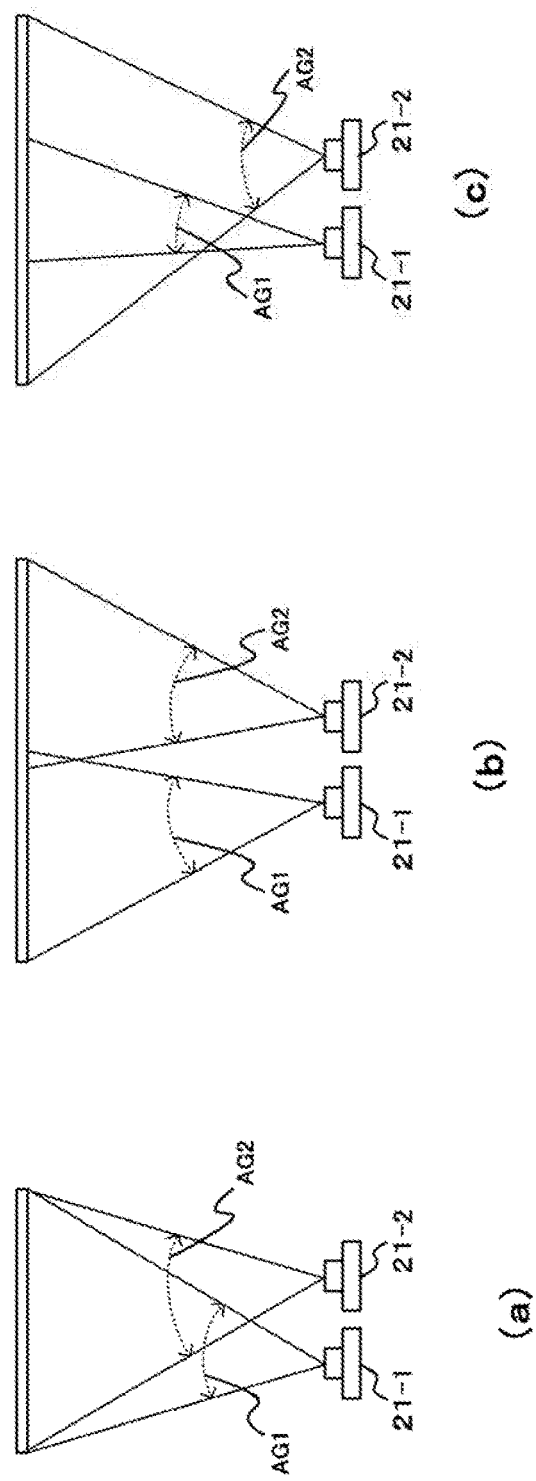
FIG. 17 is a diagram depicting an example of imaging regions of a plurality of imaging sections.

Moreover, the image processing section can easily generate a combined image with an improved functionality, compared with model-based characteristic difference correction and combining processing. FIG. 17 depicts an example of imaging regions of a plurality of imaging sections. It is noted that FIG. 17 depicts an example of a case of using the two imaging sections 21-1 and 21-2, and depicts the imaging section 21-1 at angle of view AG1 and the imaging section 21-2 at an angle of view AG2. FIG. 17(a) depicts a case in which the imaging sections 21-1 and 21-2 capture the same subject range as in the embodiment described above. In addition, FIG. 17(b) depicts an example of a case in which subject ranges captured by the imaging sections 21-1 and 21-2 overlap only partially, and FIG. 17(c) depicts an example of a case in which a subject range captured by one of the imaging sections 21-1 and 21-2 different in angle of view is contained in a subject range captured by the other imaging section. For example, the image processing section can generate a captured image at a wide angle of view by combining the captured images disposed as depicted in FIG. 17(b) while making characteristics thereof uniform. In addition, the image processing section can easily change over a wide-angle image and a zoom image with a high image quality by making characteristics of the captured images disposed as depicted in FIG. 17(c) uniform. Furthermore, in FIG. 17(c), the imaging section 21-1 can generate a captured black-and-white image or a captured color image, and the imaging section 21-2 can also enhance the resolution of a captured infrared image up to the resolution of either the captured black-and-white image or the captured color image. Moreover, the combination of the elements depicted in FIG. 16 makes it possible to improve performances of the image processing section such as autofocusing speed, auto iris adjustment, auto white balance adjustment, and the like.

6. Application Examples

The technology according to the present disclosure can be applied to various products. For example, the technology according to the present disclosure may be implemented as a device mounted not only in the information processing terminal but also in a mobile body of any of kinds such as a vehicle, an electric-powered vehicle, a hybrid electric-powered vehicle, a two-wheeled vehicle, a bicycle, a personal mobility, an airplane, a drone, a ship, a robot, a construction machine, and an agricultural machine (tractor).

Figure 18:
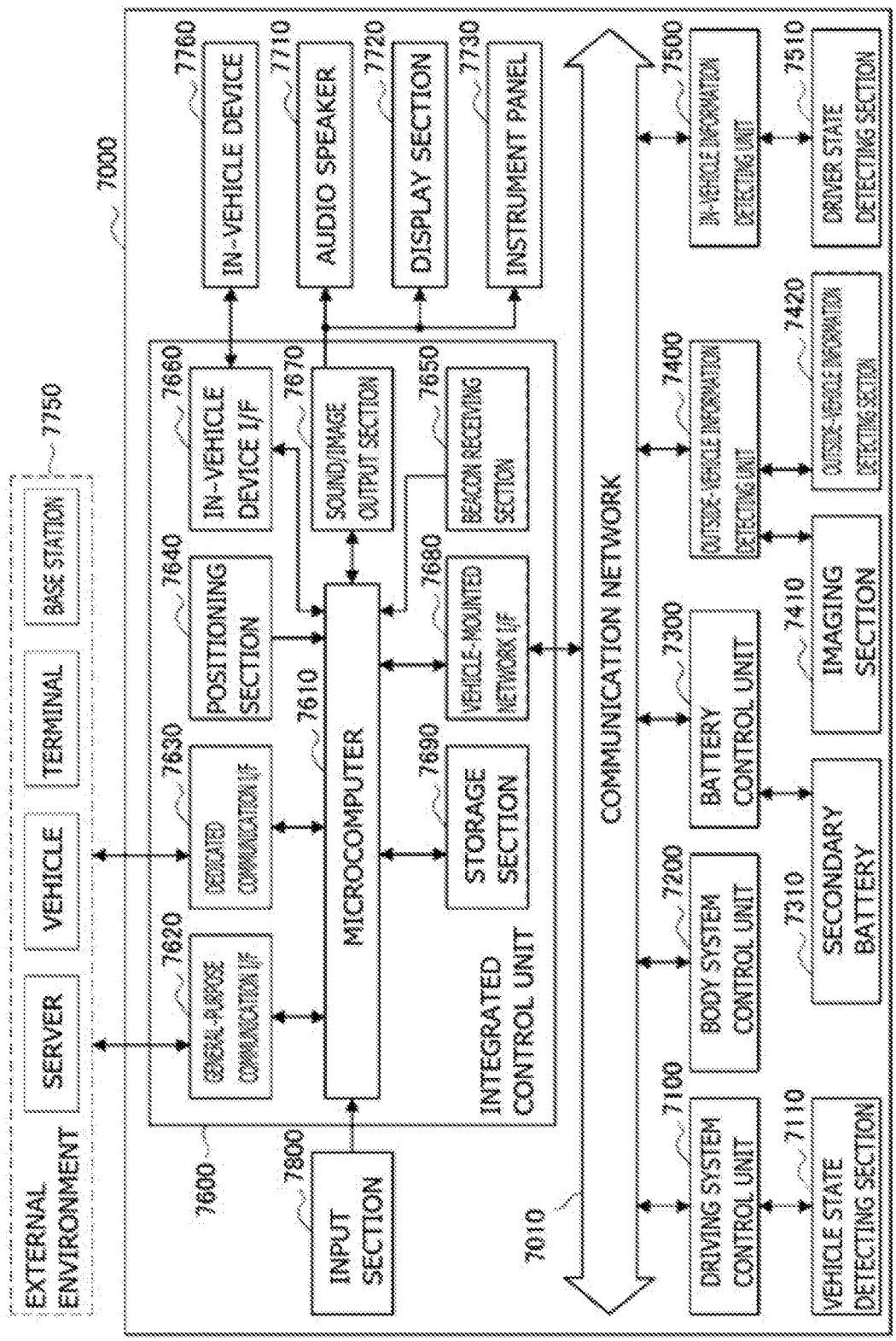
FIG. 18 is a block diagram depicting an example of schematic configuration of a vehicle control system.

FIG. 18 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 18, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 18 includes a microcomputer 7610, a general-purpose communication I/F 7620, a dedicated communication I/F 7630, a positioning section 7640, a beacon receiving section 7650, an in-vehicle device 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The drive system control unit 7100 may have a function as a control device of an antilock brake system (ABS), electronic stability control (ESC), or the like.

The driving system control unit 7100 is connected with a vehicle state detecting section 7110. The vehicle state detecting section 7100, for example, includes at least one of a gyro sensor that detects the angular velocity of axial rotational movement of a vehicle body, an acceleration sensor that detects the acceleration of the vehicle, and sensors for detecting an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, or an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 19:
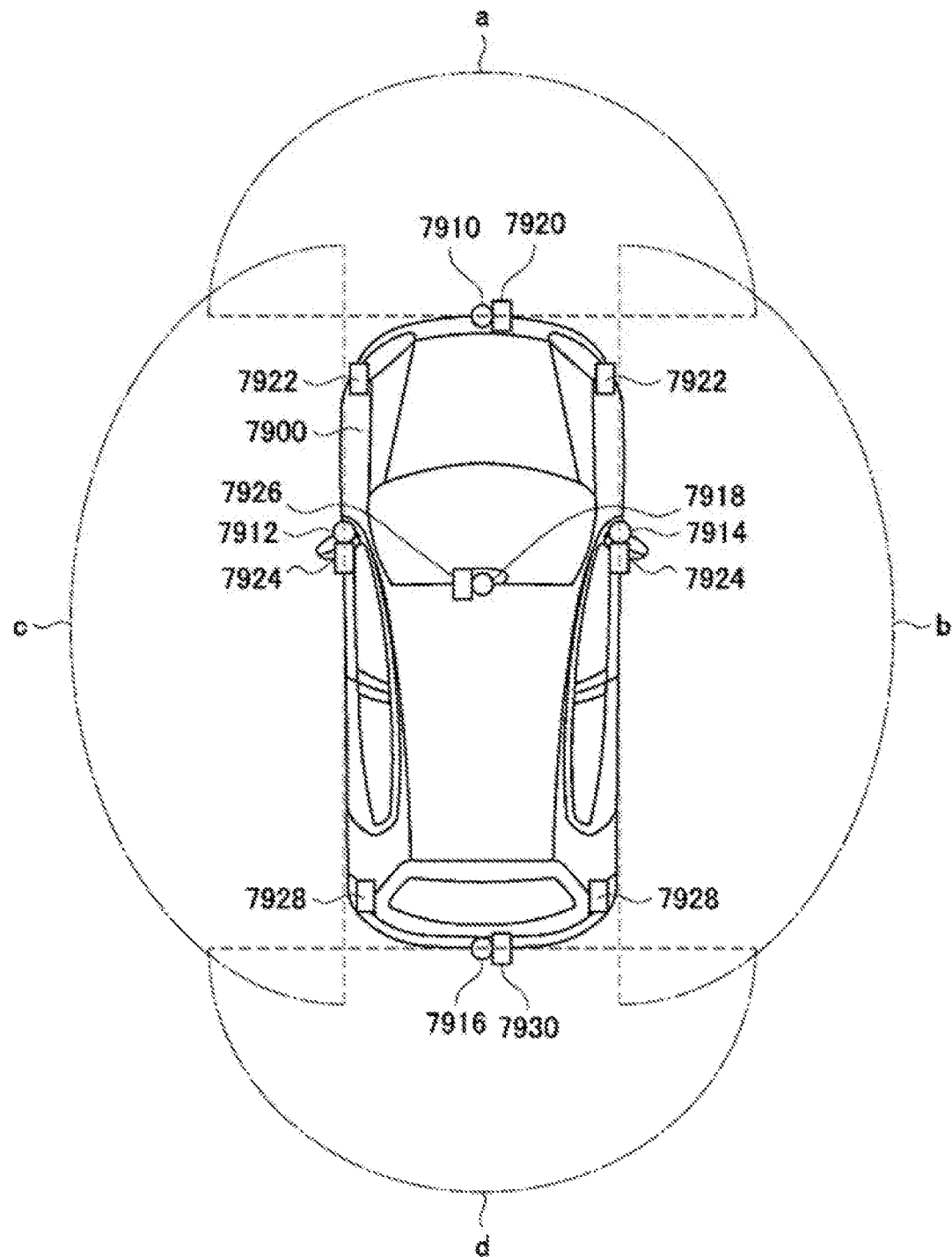
FIG. 19 is a diagram of assistance in explaining an example of installation positions of an outside-vehicle information detecting section and an imaging section.

FIG. 19 depicts an example of installation positions of the imaging section 7410 and the outside-vehicle information detecting section 7420. Imaging sections 7910, 7912, 7914, 7916, and 7918 are, for example, disposed at at least one of positions on a front nose, side view mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle obtains is used mainly to detect a preceding vehicle, a pedestrian, an obstacle, a signal, a traffic sign, a lane, or the like.

Incidentally, FIG. 19 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 18, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as a global system for mobile communications (GSM), worldwide interoperability for microwave access (WiMAX), long term evolution (LTE), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of a driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediate connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle device 7760 may, for example, include at least one of a mobile device and a wearable device possessed by an occupant and an information device carried into or attached to the vehicle. The in-vehicle device 7760 may also include a navigation device that searches for a path to an arbitrary destination. The in-vehicle device I/F 7660 exchanges control signals or data signals with these vehicle devices 7760.

The vehicle-mounted network I/F 7680 is an interface that mediate communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may be, for example, a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 18, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 18 may be integrated into one control unit. Alternatively, each individual control unit may include a plurality of control units. Further, the vehicle control system 7000 may include another control unit, not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described so far, each of the imaging sections 7410, 7910, 7912, 7914, 7916, and 7918 is assumed to be configured using a plurality of imaging sections, for example, the imaging sections 21-1 and 21-2 depicted in FIG. 1. In addition, the image processing section 22 is provided in the integrated control unit 7600 in the application example depicted in FIG. 18. With such configuration, even if the imaging sections 7410, 7910, 7912, 7914, 7916, and 7918 are miniaturized and slimmed down, it is possible to acquire high-performance captured images; thus, the acquired captured images can be utilized for driving assist, driving control, and the like. It is noted that the image processing section 22 may be implemented in a module (for example, an integrated circuit module configured with one die) for the integrated control unit 7600 depicted in FIG. 18.

A series of processing described in the specification can be executed by hardware, software, or a composite configuration of both the hardware and the software. In a case of executing the processing by the software, a program recording a processing sequence is installed into a memory within a computer incorporated into dedicated hardware to be executed. Alternatively, a program can be executed by being installed into a general-purpose computer capable of executing various kinds of processing.

For example, the program can be recorded in advance into a hard disc, a solid state drive (SSD), or a read only memory (ROM) serving as storage media. Alternatively, the program can be stored (recorded) either temporarily or persistently into a removable recording medium such as a flexible disc, a compact disc read only memory (CD-ROM), a magnetooptical (MO) disc, a digital versatile disc (DVD), a blu-ray disc (BD) (registered trademark), a magnetic disc, or a semiconductor memory card. Such a removable recording medium can be provided as so-called package software.

Furthermore, the program may be not only installed from the removable recording medium into the computer but also may be transferred to the computer by either wireless or wired transfer from a download website via a network such as a local area network (LAN) or the Internet. The computer can receive the program transferred in that way and install the program in a recording medium such as a hard disc included in the computer.

The effects described in the present specification are given as an example only, and the effects are not limited to those described in the specification and may contain additional effects. In addition, the present technology should not limit interpretation of the embodiment of the technology described above. The embodiment of the technology discloses the present technology in the form of examples and it is obvious that a person ordinary skilled in the art could conceive modifications and alterations of the embodiment within the scope of the present technology. In other words, reference should be made to claims for the assessment of the scope of the present technology.

In addition, an image processing device of the present technology can adopt the following configuration.

(1) An image processing device including:

a characteristic difference correction section correcting, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section to image data having a higher performance.

(2) The image processing device according to (1), further including:

a parallax detecting section detecting a parallax between the first imaging section and the second imaging section using the characteristic-difference-corrected image data by the characteristic difference correction section; and a parallax compensation section performing parallax compensation for the image data generated by the first imaging section and the second imaging section on the basis of a parallax detection result detected by the parallax detecting section.

(3) The image processing device according to (2), in which the parallax compensation section performs the parallax compensation on one of the image data generated by the first imaging section and the second imaging section, and the characteristic difference correction section corrects a resolution of the other image data to a resolution of the image data subjected to the parallax compensation for the image data used in detection of the parallax.

(4) The image processing device according to (2) or (3), further including:

an image combining section that combines, in accordance with a learning model for making characteristics of combined data of a plurality of pieces of student data identical to characteristics of teacher data, assuming image data on a learning image as the teacher data and the image data on the learning image generated by the first imaging section and the image data on the learning image generated by the second imaging section as the student data, the image data on the captured images generated by the first imaging section and the second imaging section, using a combining control parameter generated in advance by learning.

(5) The image processing device according to (4), in which the image combining section performs combining of the image data after the parallax compensation for the image data generated by the first imaging section and the second imaging section.

(6) The image processing device according to (4) or (5), in which the characteristic difference correction section corrects the image data having the lower performance out of the image data on the captured images generated by the first imaging section and the second imaging section to the image data having the higher performance, using a characteristic difference correction parameter generated in advance by learning for making the characteristics of the student data identical to the characteristics of the teacher data, and the image combining section combines the image data on the captured images generated by the first imaging section and the second imaging section, using the combining control parameter generated in advance by the learning for making the characteristics of the combined data of the plurality of pieces of student data identical to the characteristics of teacher data.

(7) The image processing device according to any of (1) to (6), in which the performance includes an image quality performance, and the characteristic difference correction section performs correction of a characteristic difference related to the image quality performance.

(8) The image processing device according to (7), in which the characteristic difference correction section performs, as the correction of the characteristic difference related to the image quality performance, correction of a characteristic difference that is at least one of a color space difference and a band difference.

(9) The image processing device according to (8), in which the first imaging section generates image data on a captured black-and-white image, the second imaging section generates image data on a captured color image that indicates one color component at a pixel, and the characteristic difference correction section makes a sensitivity of the image data on the captured color image higher than a sensitivity of the image data generated by the second imaging section, as the correction of the characteristic difference with respect to the band difference.

(10) The image processing device according to any one of (1) to (9), in which the performance includes a functional performance, and the characteristic difference correction section performs correction of a characteristic difference related to the functional performance.

(11) The image processing device according to (10), in which the characteristic difference correction section performs, as the correction of the characteristic difference related to the functional performance, correction of a characteristic difference caused by a difference in at least any of an angle of view, a focal length, focusing control, diaphragm control, and white balance control.

INDUSTRIAL APPLICABILITY

In the image processing device and the image processing method of the present technology, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section is corrected to image data having a higher performance. Thus, it is possible to generate image data on a captured image having an improved performance, compared with captured images generated individually by a plurality of imaging sections, using the image data on the captured images generated individually. Therefore, the present technology is suited for equipment using an imaging section, and the equipment being required to miniaturize or slim down the imaging section.

REFERENCE SIGNS LIST

10 . . . Information processing terminal
21-1, 21-2 . . . Imaging section
22 . . . Image processing section
23 . . . Sensor section
24 . . . Communication section
25 . . . Display section
26 . . . Touch panel
27 . . . Operation section 28 ... Storage section
30 ... Control section
50, 60 ... Learning device
51, 61 ... First imaging simulation section
52, 62 ... Second imaging simulation section
53 ... First characteristic difference correction parameter generation section
54 ... Second characteristic difference correction parameter generation section
63 ... Combining control parameter generation section
221 ... Developing processing section
222 ... Characteristic difference correction section.
222-1 ... First characteristic difference correction section
222-2 ... Second characteristic difference correction section
223 ... Parallax detecting section
223 ... Parallax compensation section
225 ... Image combining section
7000 ... Vehicle control system

The invention claimed is:

1. An image processing device comprising:
a characteristic difference correction section configured to correct, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section to image data having a higher performance; and
an image combining section configured to combine, in accordance with a learning model for making characteristics of combined data of a plurality of pieces of student data identical to characteristics of teacher data, assuming the image data on the learning image as the teacher data and the image data on the learning image generated by the first imaging section and the image data on the learning image generated by the second imaging section as the student data, the image data on the captured images generated by the first imaging section and the second imaging section, using a combining control parameter generated in advance by learning,
wherein the characteristic difference correction section and the image combining section are each implemented via at least one processor.

2. The image processing device according to claim 1, further comprising:
a parallax detecting section configured to detect a parallax between the first imaging section and the second imaging section using the characteristic-difference-corrected image data by the characteristic difference correction section; and
a parallax compensation section configured to perform parallax compensation for the image data generated by the first imaging section and the second imaging section on the basis of a parallax detection result detected by the parallax detecting section,
wherein the parallax detecting section and the parallax compensation section are each implemented via at least one processor.

3. The image processing device according to claim 2, wherein
the parallax compensation section performs the parallax compensation on one of the image data generated by the first imaging section and the second imaging section, and
the characteristic difference correction section corrects a resolution of the other image data to a resolution of the image data subjected to the parallax compensation for the image data used in detection of the parallax.

4. The image processing device according to claim 2, wherein
the image combining section performs combining of the image data after the parallax compensation for the image data generated by the first imaging section and the second imaging section.

5. The image processing device according to claim 1, wherein
the characteristic difference correction section corrects the image data having the lower performance out of the image data on the captured images generated by the first imaging section and the second imaging section to the image data having the higher performance, using a characteristic difference correction parameter generated in advance by learning for making the characteristics of the student data identical to the characteristics of the teacher data, and
the image combining section combines the image data on the captured images generated by the first imaging section and the second imaging section, using the combining control parameter generated in advance by the learning for making the characteristics of the combined data of the plurality of pieces of student data identical to the characteristics of teacher data.

6. The image processing device according to claim 1, wherein
the performance includes an image quality performance, and
the characteristic difference correction section performs correction of a characteristic difference related to the image quality performance.

7. The image processing device according to claim 6, wherein
the characteristic difference correction section performs, as the correction of the characteristic difference related to the image quality performance, correction of a characteristic difference that is at least one of a color space difference and a band difference.

8. The image processing device according to claim 7, wherein
the first imaging section generates image data on a captured black-and-white image,
the second imaging section generates image data on a captured color image that indicates one color component at a pixel, and
the characteristic difference correction section makes a sensitivity of the image data on the captured color image higher than a sensitivity of the image data generated by the second imaging section, as the correction of the characteristic difference with respect to the band difference.

9. The image processing device according to claim 1, wherein
the performance includes a functional performance, and
the characteristic difference correction section performs correction of a characteristic difference related to the functional performance.

10. The image processing device according to claim 9, wherein the characteristic difference correction section performs, as the correction of the characteristic difference related to the functional performance, correction of a characteristic difference caused by a difference in at least any of an angle of view, a focal length, focusing control, diaphragm control, and white balance control.

11. An image processing method, comprising:
correcting, in accordance with a learning model for making characteristics of student data identical to characteristics of teacher data, assuming one of image data on a learning image generated by a first imaging section and image data on the learning image generated by a second imaging section and different in characteristics from the first imaging section as the teacher data and the other image data as the student data, image data having a lower performance out of the image data on captured images generated by the first imaging section and the second imaging section to image data having a higher performance; and
combining, in accordance with a learning model for making characteristics of combined data of a plurality of pieces of student data identical to characteristics of teacher data, assuming the image data on the learning image as the teacher data and the image data on the learning image generated by the first imaging section and the image data on the learning image generated by the second imaging section as the student data, the image data on the captured images generated by the first imaging section and the second imaging section, using a combining control parameter generated in advance by learning.

12. A learning device comprising:
a characteristic difference parameter generation section generating a characteristic difference correction parameter for making characteristics of student data identical to characteristics of teacher data by learning, assuming, for image data that indicates a learning image generated by a first imaging simulation section from image data on the learning image captured by a first imaging section and image data that indicates the learning image generated by a second imaging simulation section from the image data on the learning image captured by a second imaging section, one of the image data as the teacher data and the other image data as the student data; and
an image combining section configured to combine, in accordance with a learning model for making characteristics of combined data of a plurality of pieces of student data identical to characteristics of teacher data, assuming the image data on the learning image as the teacher data and the image data on the learning image generated by the first imaging section and the image data on the learning image generated by the second imaging section as the student data, the image data on the captured images generated by the first imaging section and the second imaging section, using a combining control parameter generated in advance by learning,
wherein the characteristic difference correction section and the image combining section are each implemented via at least one processor.

13. The learning device according to claim 12, further comprising:
a combining control parameter generation section configured to generate the combining control parameter for making combined data of a plurality of pieces of student data identical to teacher data by learning, assuming the image data on the learning image as the teacher data and the image data generated by the first imaging section and the image data generated by the second imaging section as the student data.

14. A learning method comprising:
generating, by a characteristic difference parameter generation section, a characteristic difference correction parameter for making characteristics of student data identical to characteristics of teacher data by learning, assuming, for image data that indicates a learning image generated by a first imaging simulation section from image data on the learning image captured by a first imaging section and image data that indicates the learning image generated by a second imaging simulation section from the image data on the learning image captured by a second imaging section, one of the image data as the teacher data and the other image data as the student data; and
combining, in accordance with a learning model for making characteristics of combined data of a plurality of pieces of student data identical to characteristics of teacher data, assuming the image data on the learning image as the teacher data and the image data on the learning image generated by the first imaging section and the image data on the learning image generated by the second imaging section as the student data, the image data on the captured images generated by the first imaging section and the second imaging section, using a combining control parameter generated in advance by learning.

* * * * *